Dec. 25, 1962 V. R. CARPENTER 3,070,268
MULTIPLE BUCK ONE-LAY BOSOM PRESS
Filed May 25, 1959 16 Sheets-Sheet 1
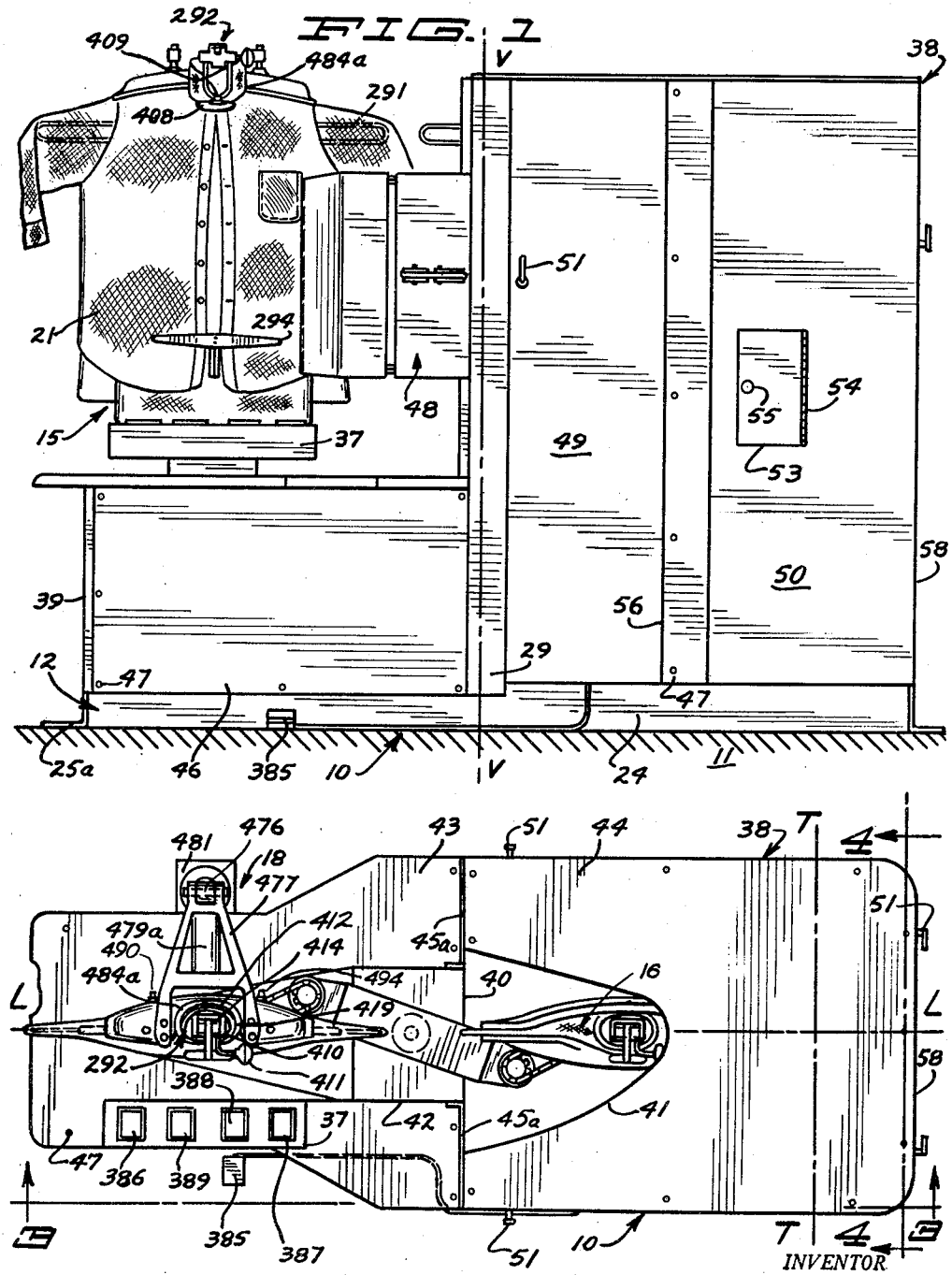
INVENTOR
VIRGIL R. CARPENTER
BY Dugger & Johnson
ATTORNEYS Dec. 25, 1962  V. R. CARPENTER  3,070,268
MULTIPLE BUCK ONE-LAY BOSOM PRESS
Filed May 25, 1959  16 Sheets-Sheet 2
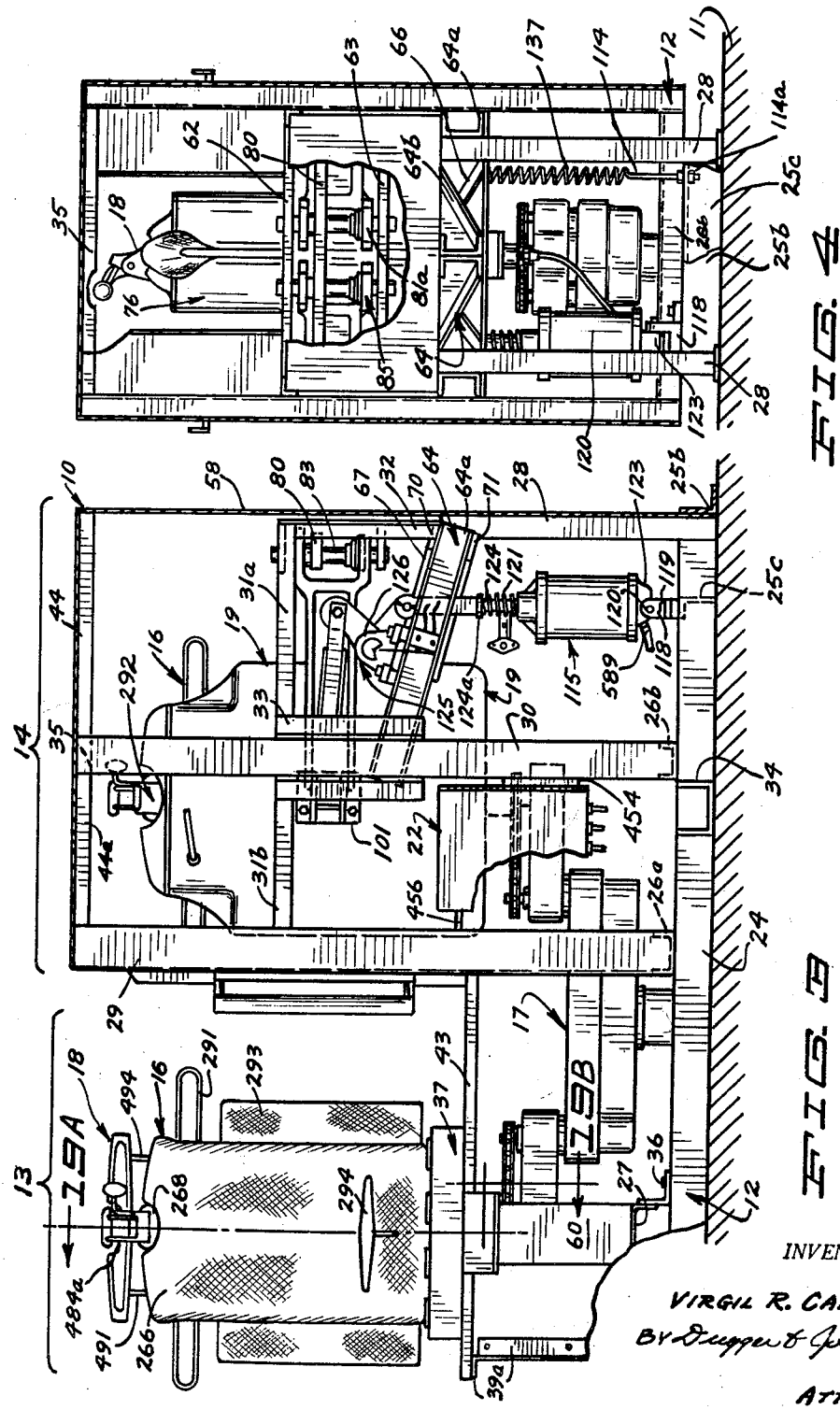
INVENTOR
VIRGIL R. CARPENTER
By Dugger & Johnson
ATTORNEYS

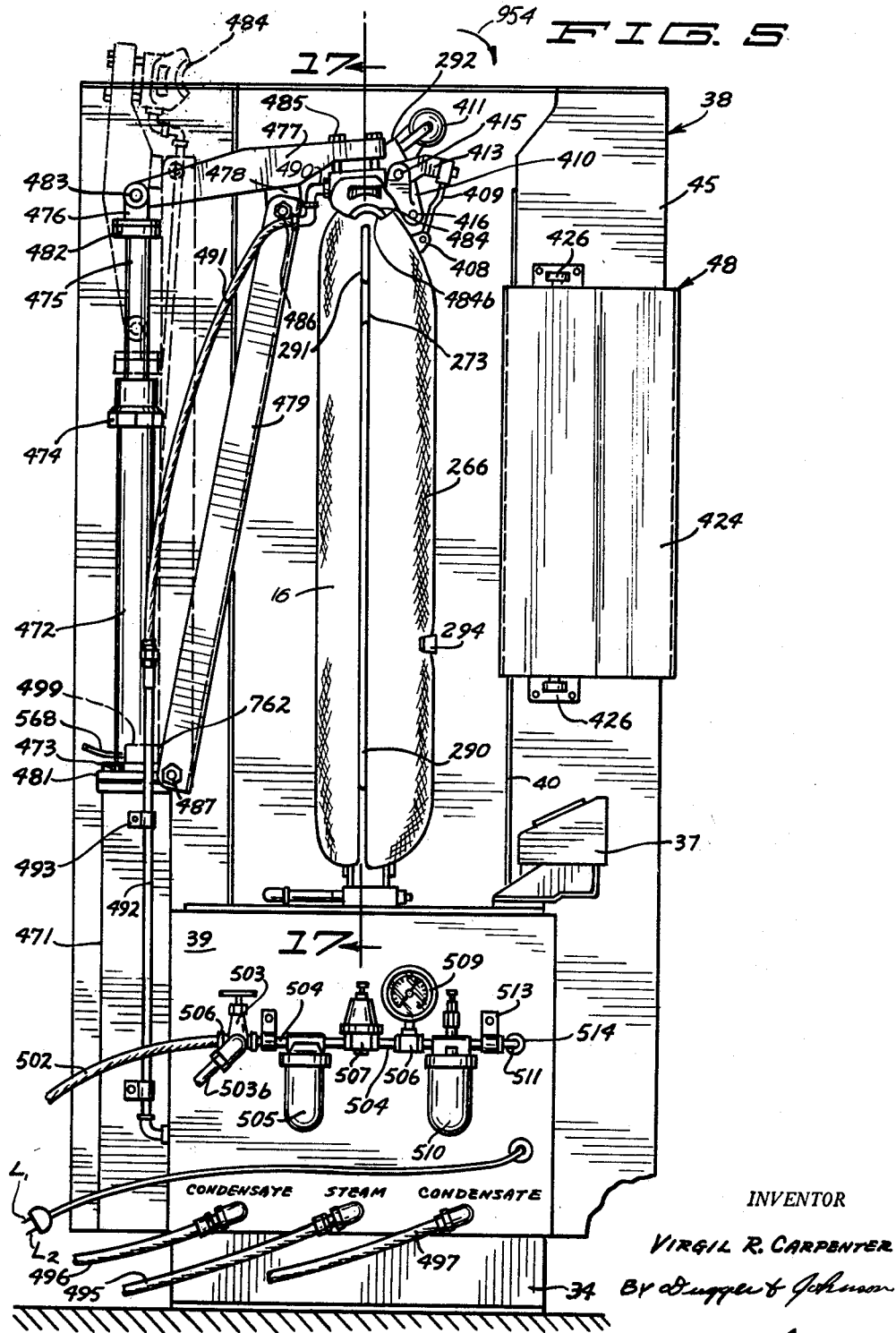

Dec. 25, 1962
V. R. CARPENTER
3,070,268
MULTIPLE BUCK ONE-LAY BOSOM PRESS
Filed May 25, 1959
16 Sheets-Sheet 4
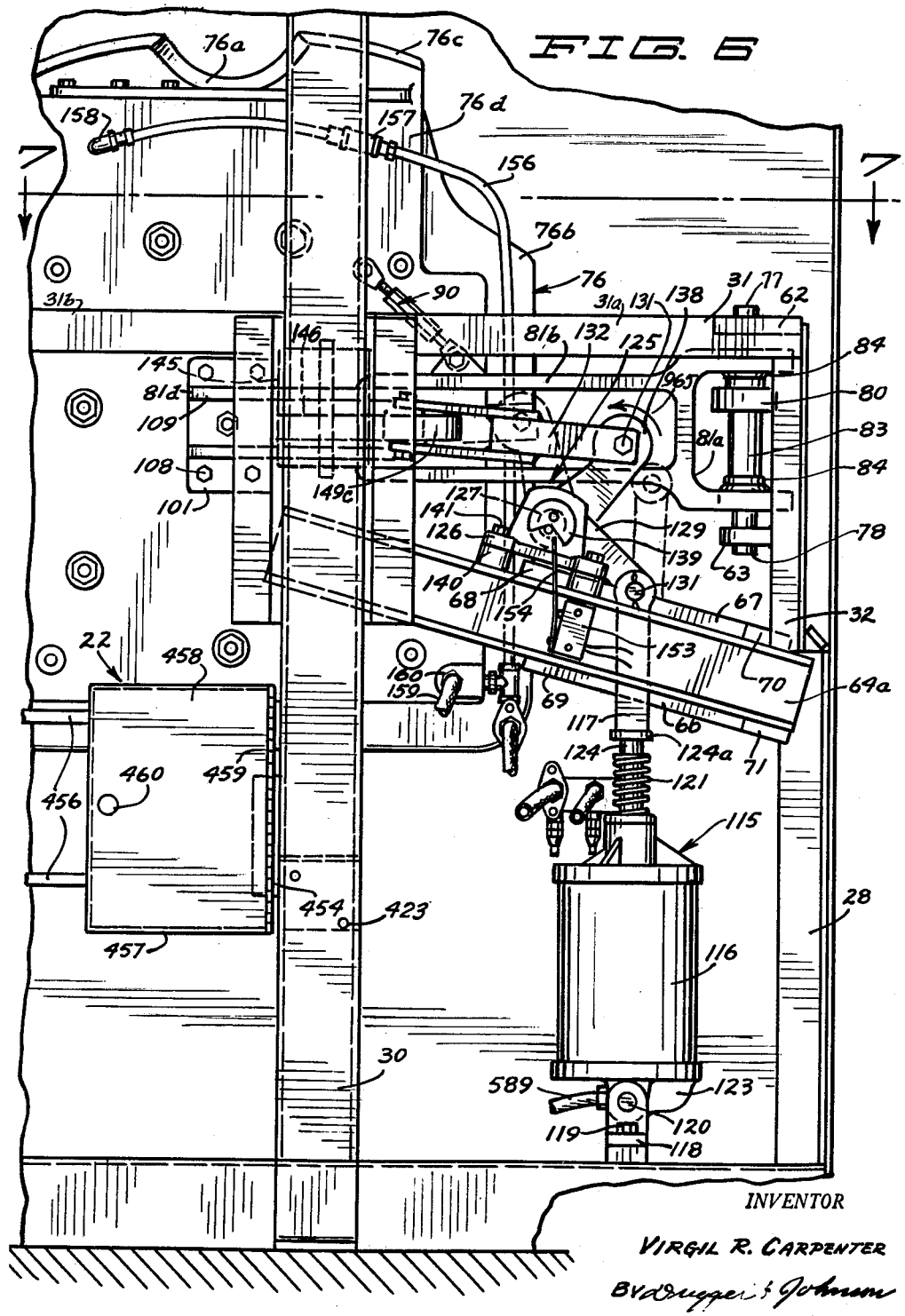
INVENTOR
VIRGIL R. CARPENTER
BY Dugger & Johnson
ATTORNEYS Dec. 25, 1962  V. R. CARPENTER  3,070,268
MULTIPLE BUCK ONE-LAY BOSOM PRESS
Filed May 25, 1959  16 Sheets-Sheet 5

INVENTOR
VIRGIL R. CARPENTER
BY Dugger & Johnson
ATTORNEYS

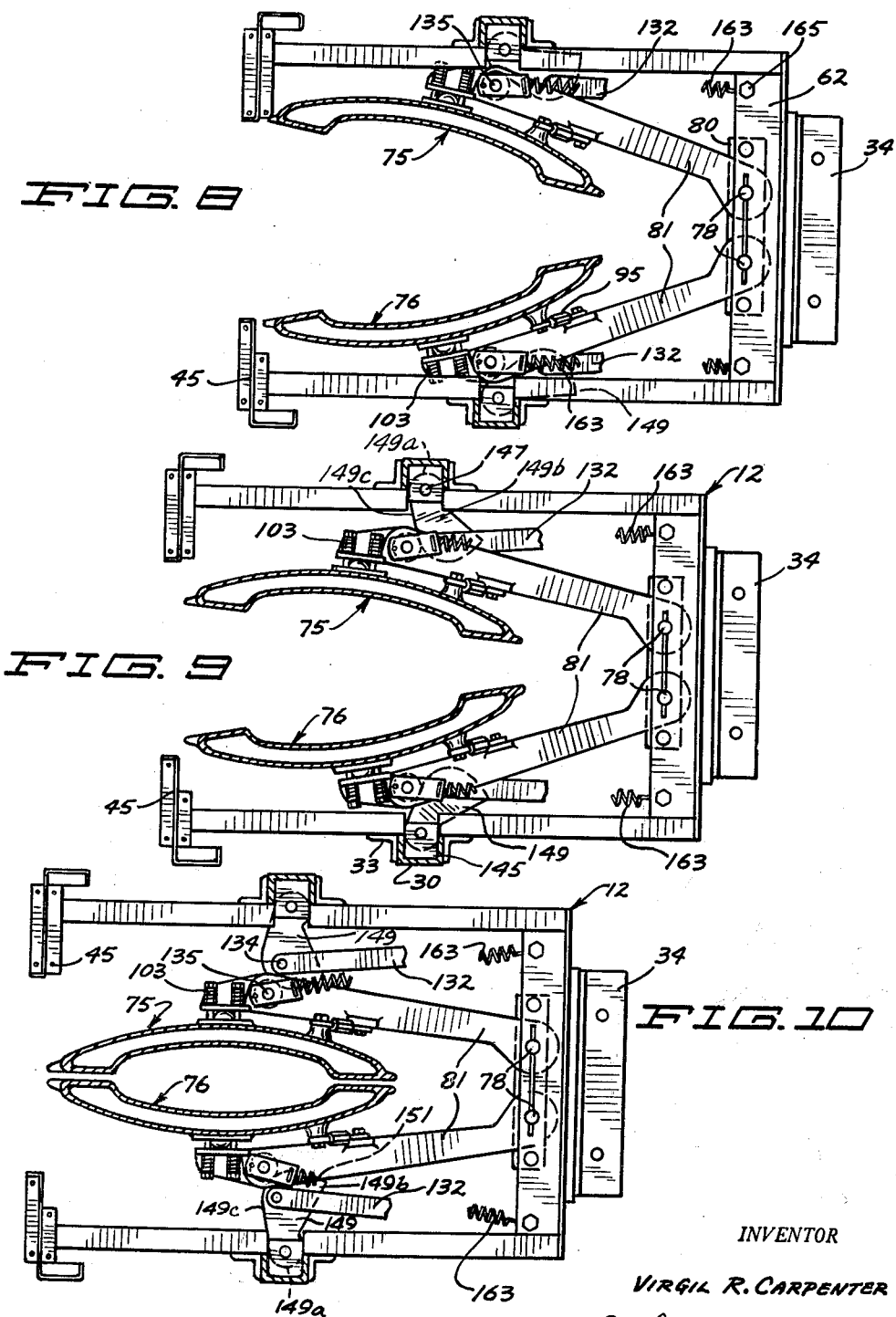

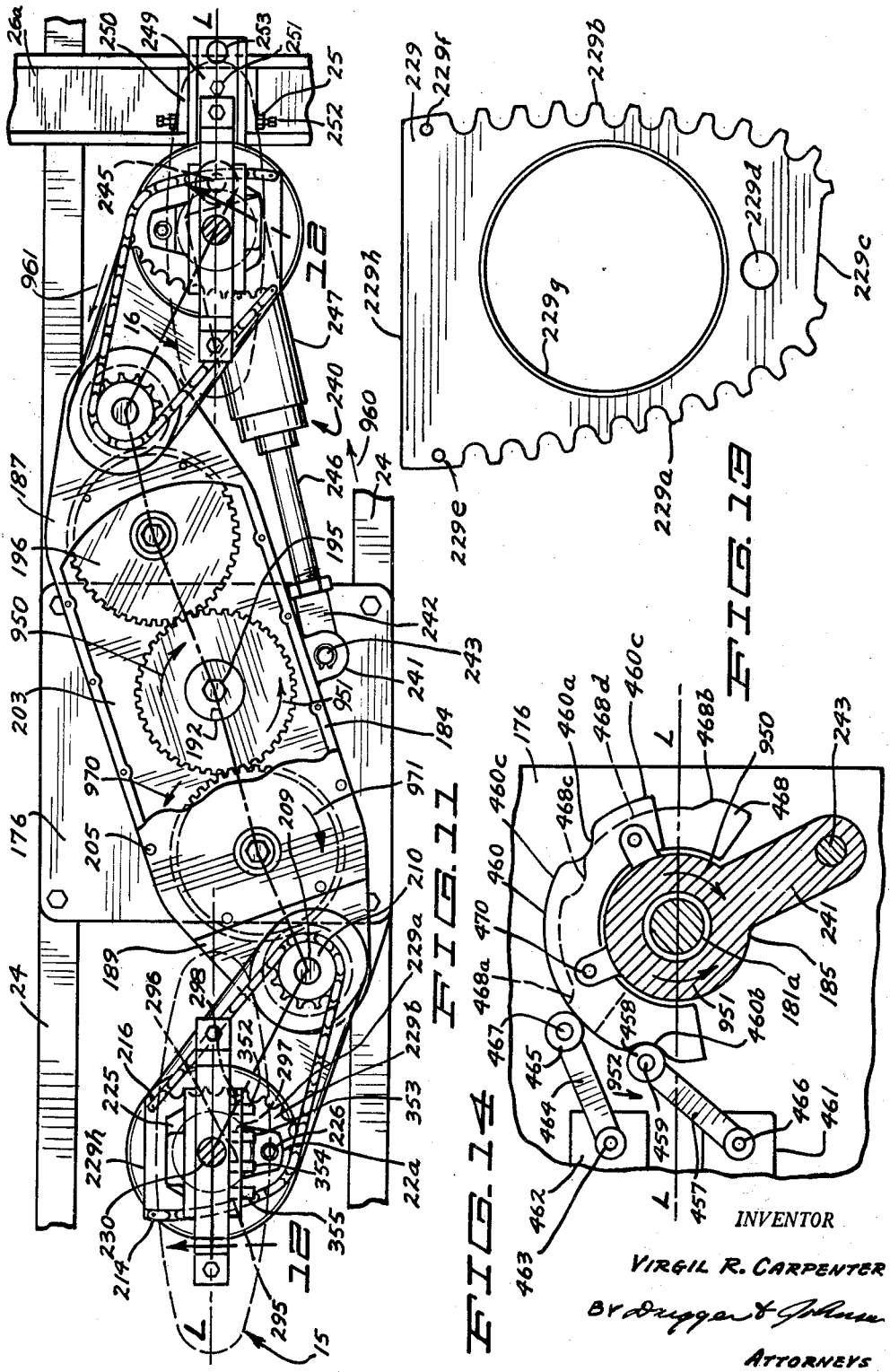

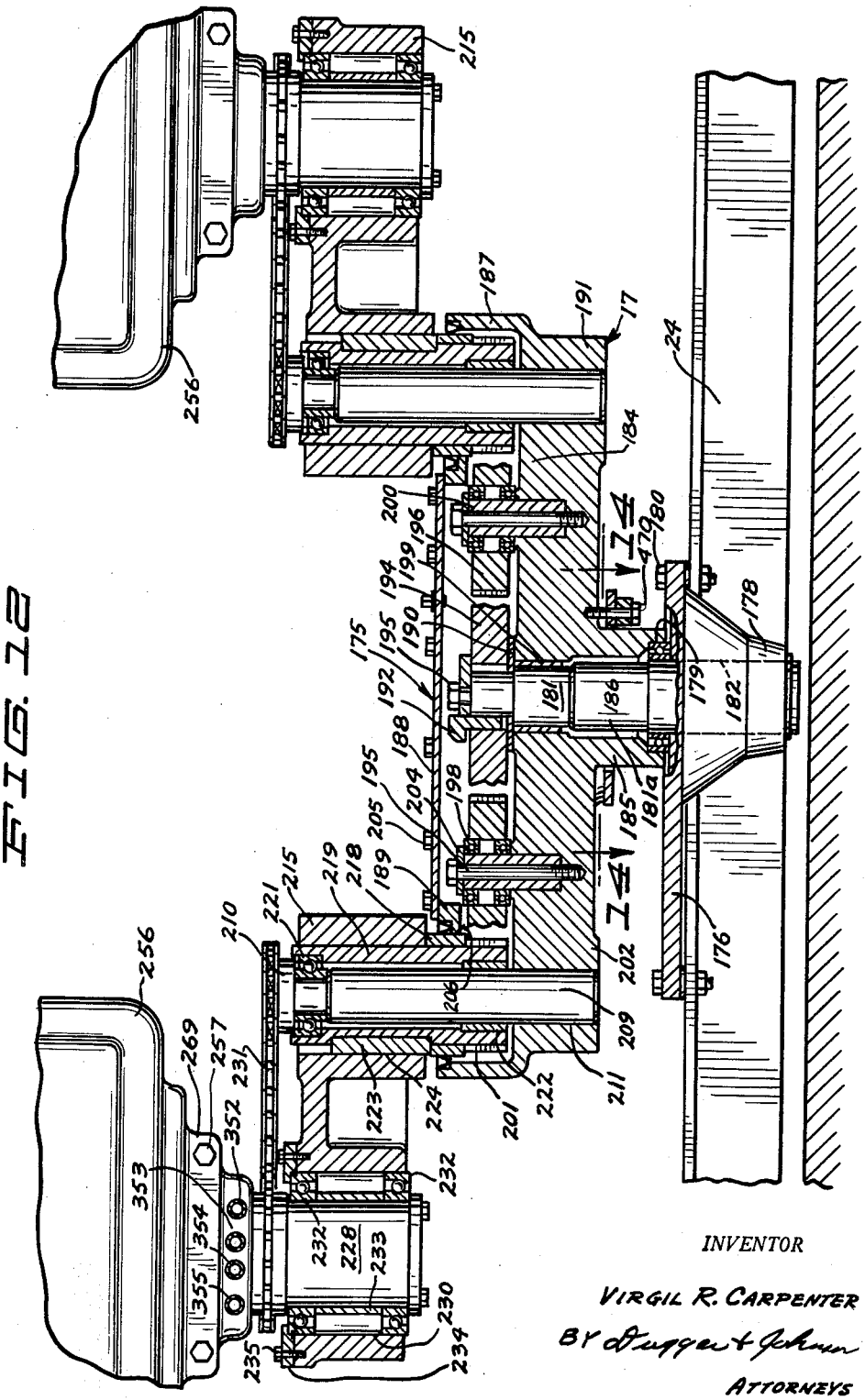

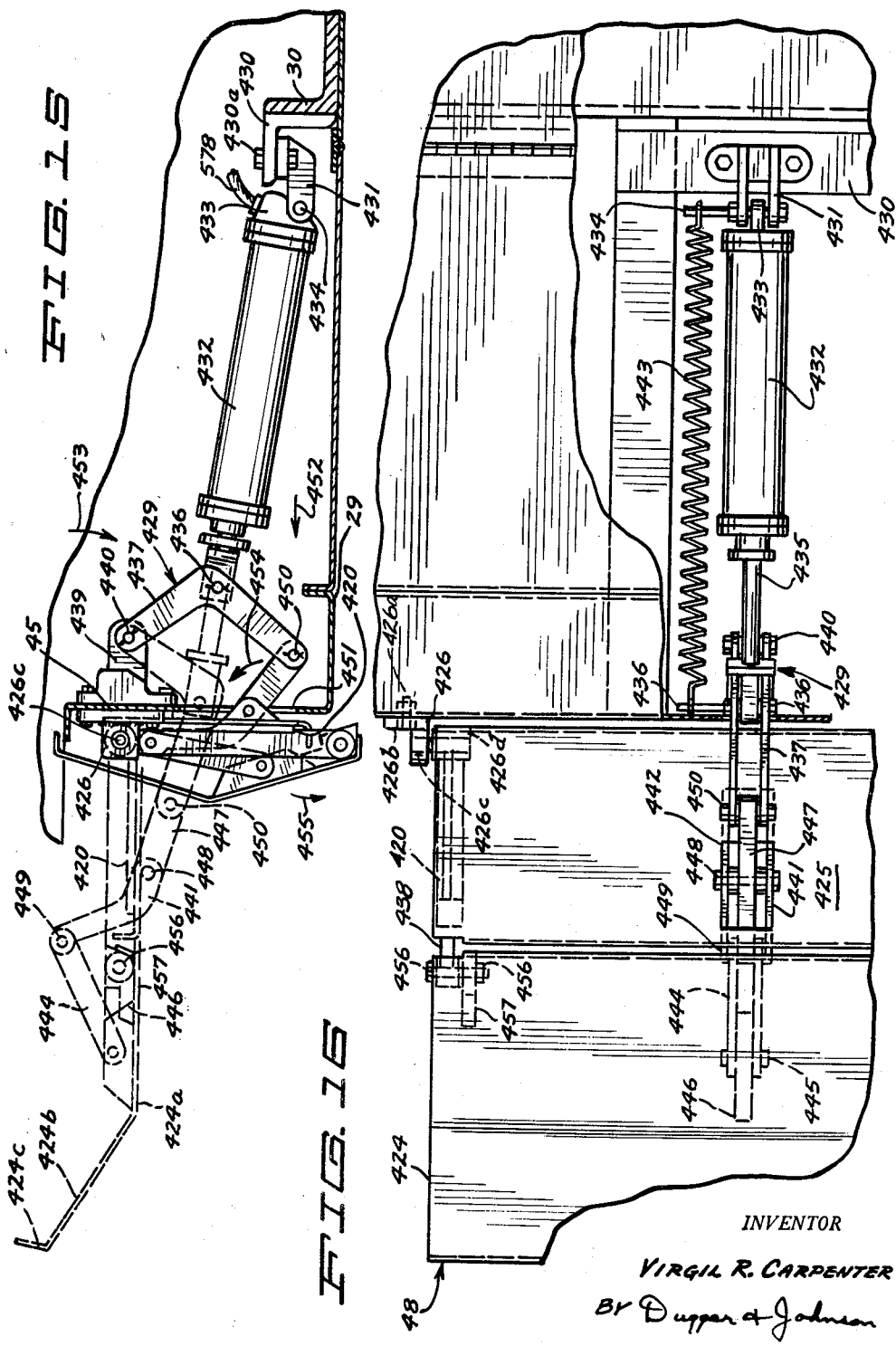

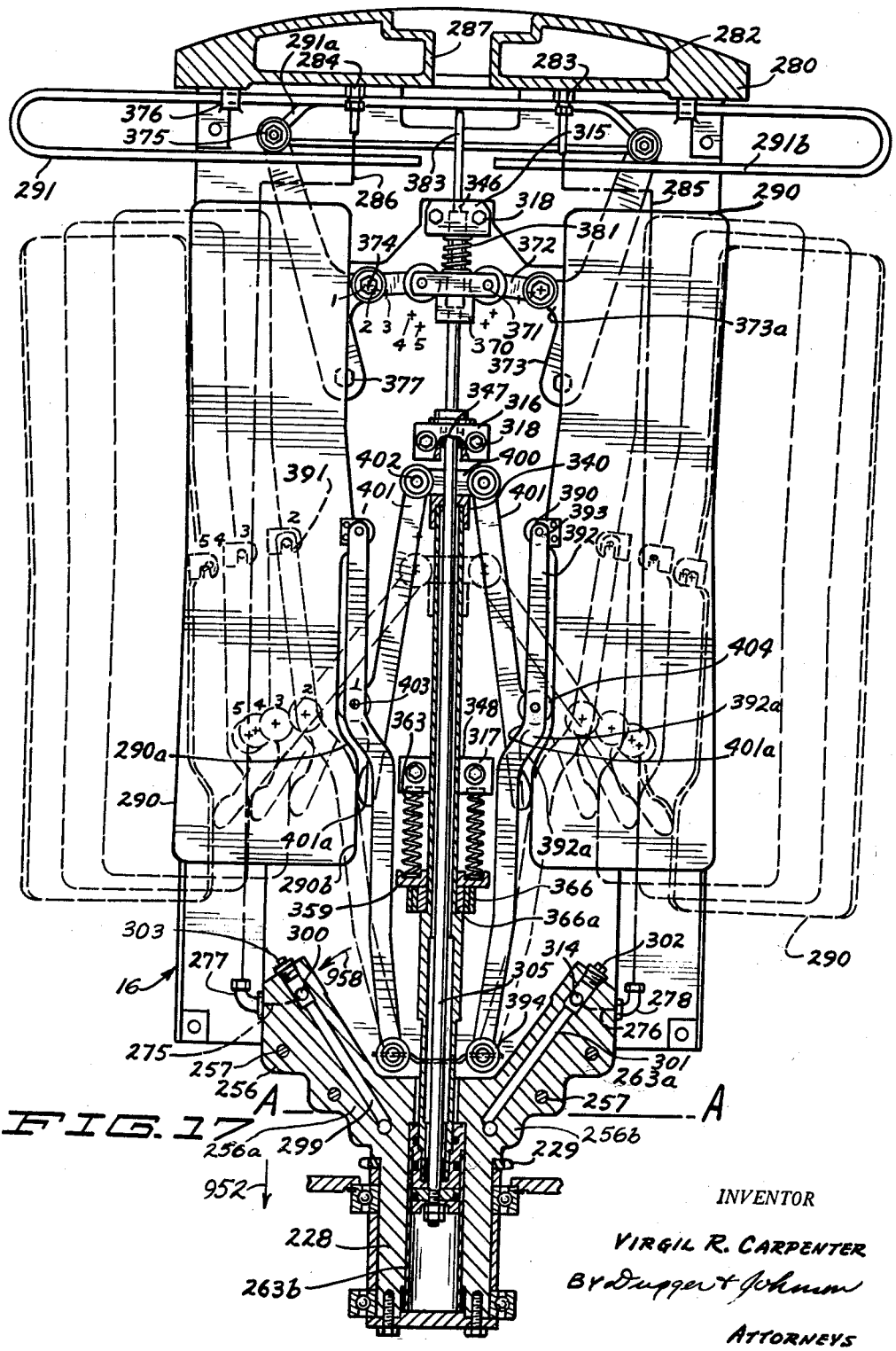

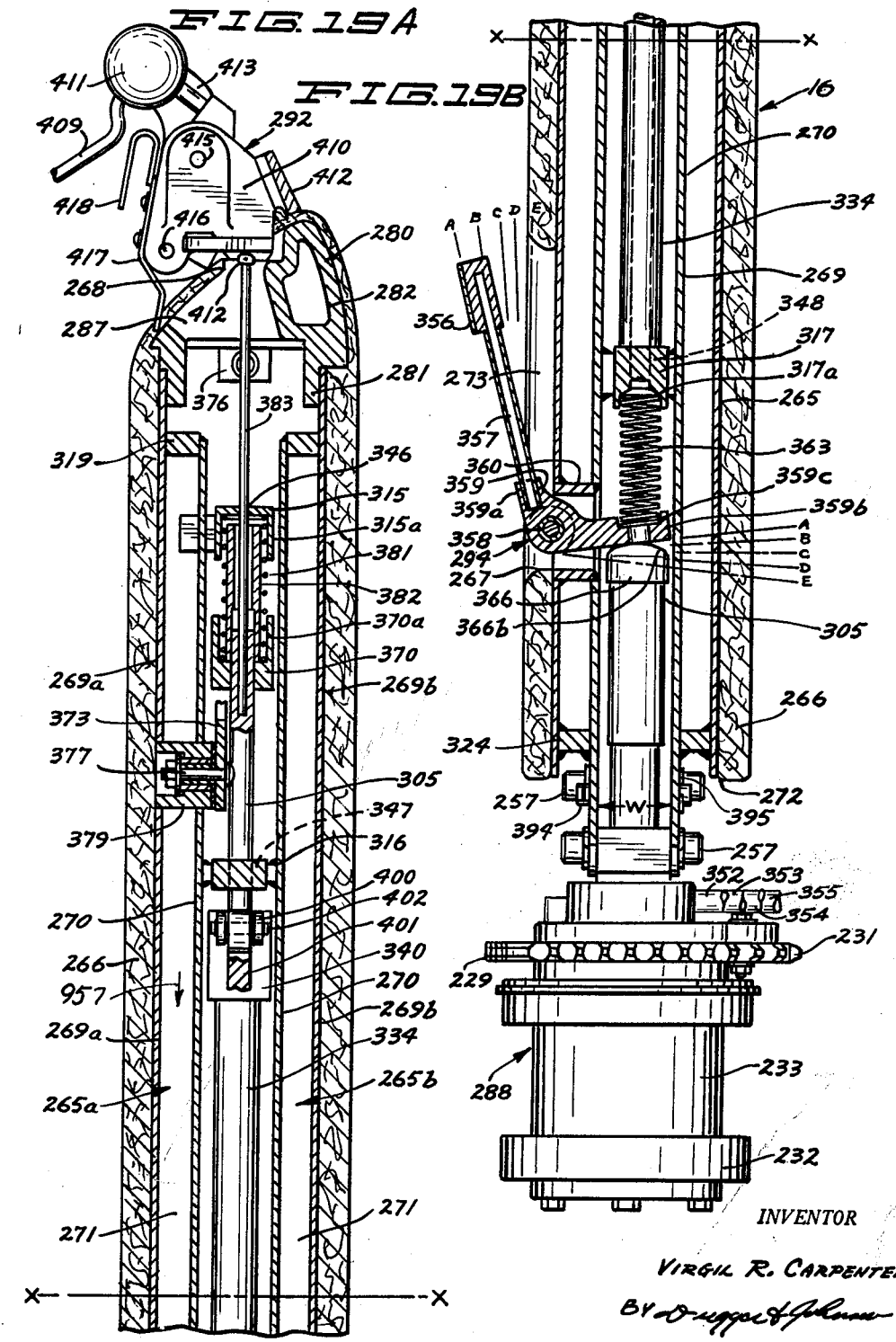

Dec. 25, 1962     V. R. CARPENTER     3,070,268
MULTIPLE BUCK ONE-LAY BOSOM PRESS
Filed May 25, 1959     16 Sheets-Sheet 13
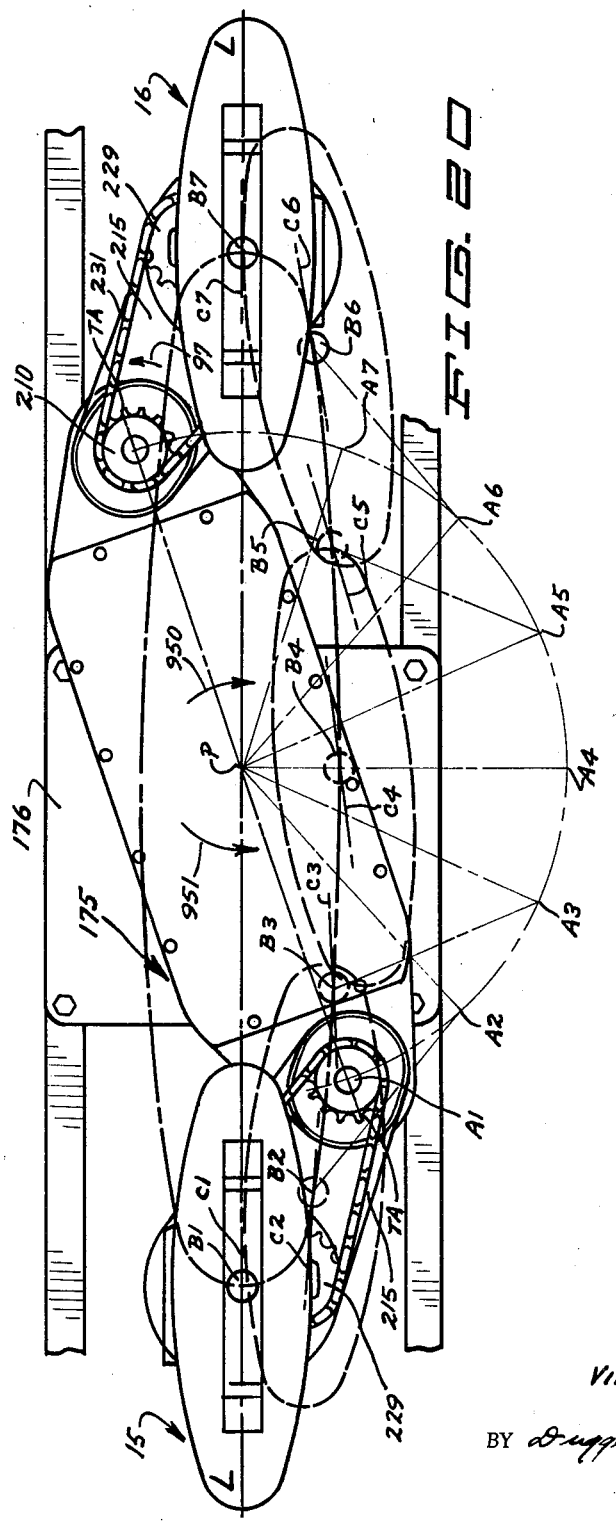
INVENTOR
VIRGIL R. CARPENTER
BY Druggist Johnson
ATTORNEYS

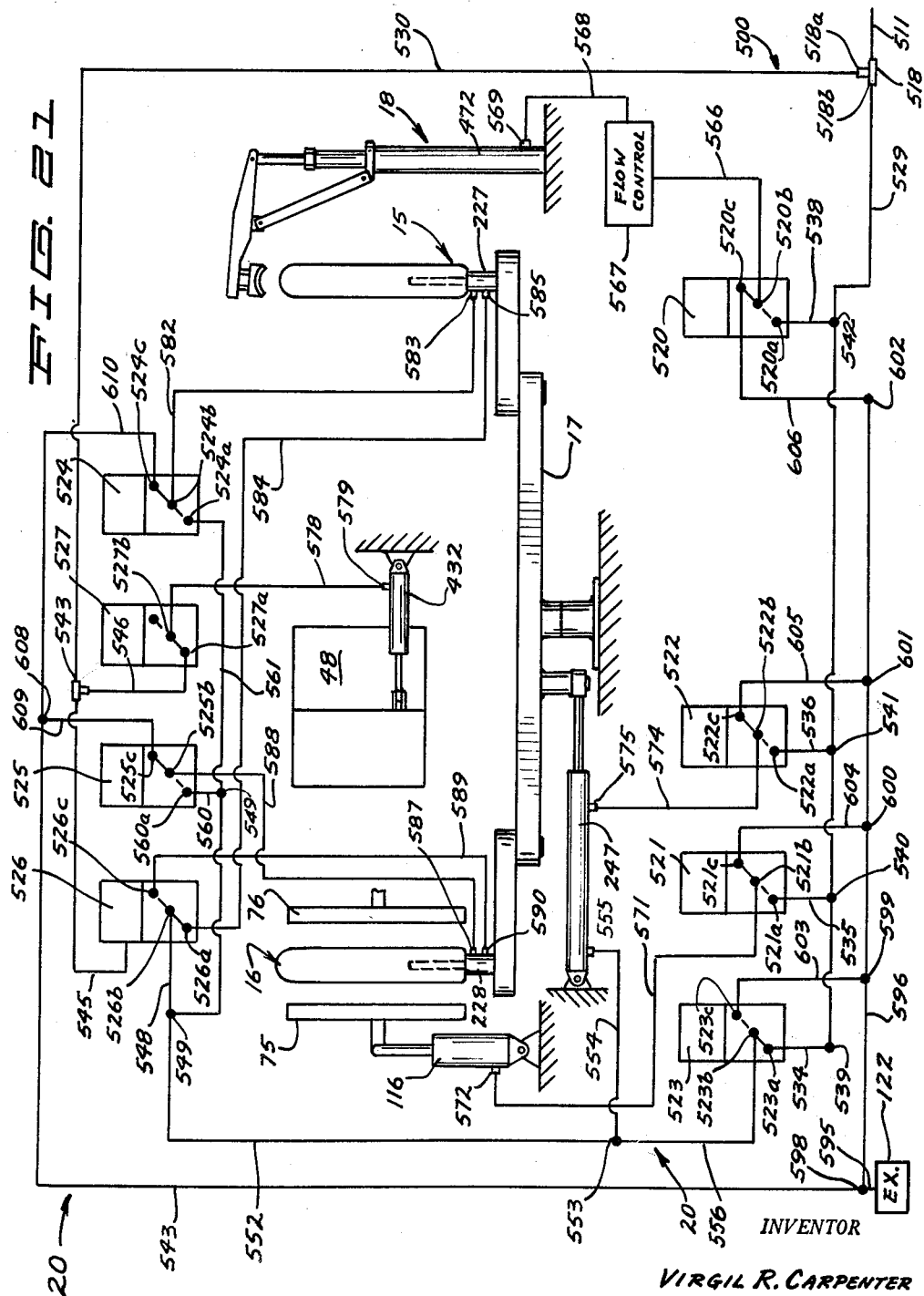

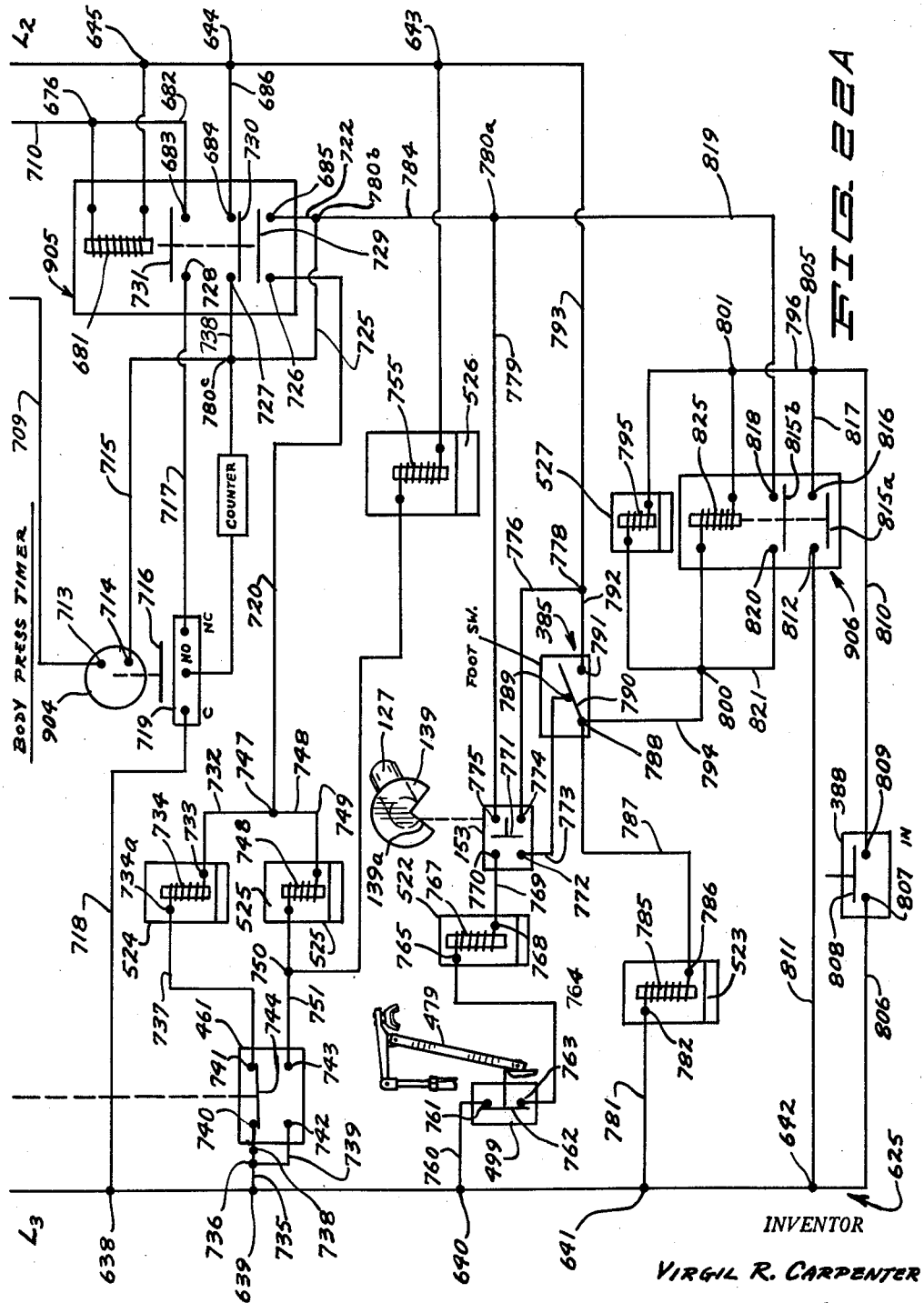

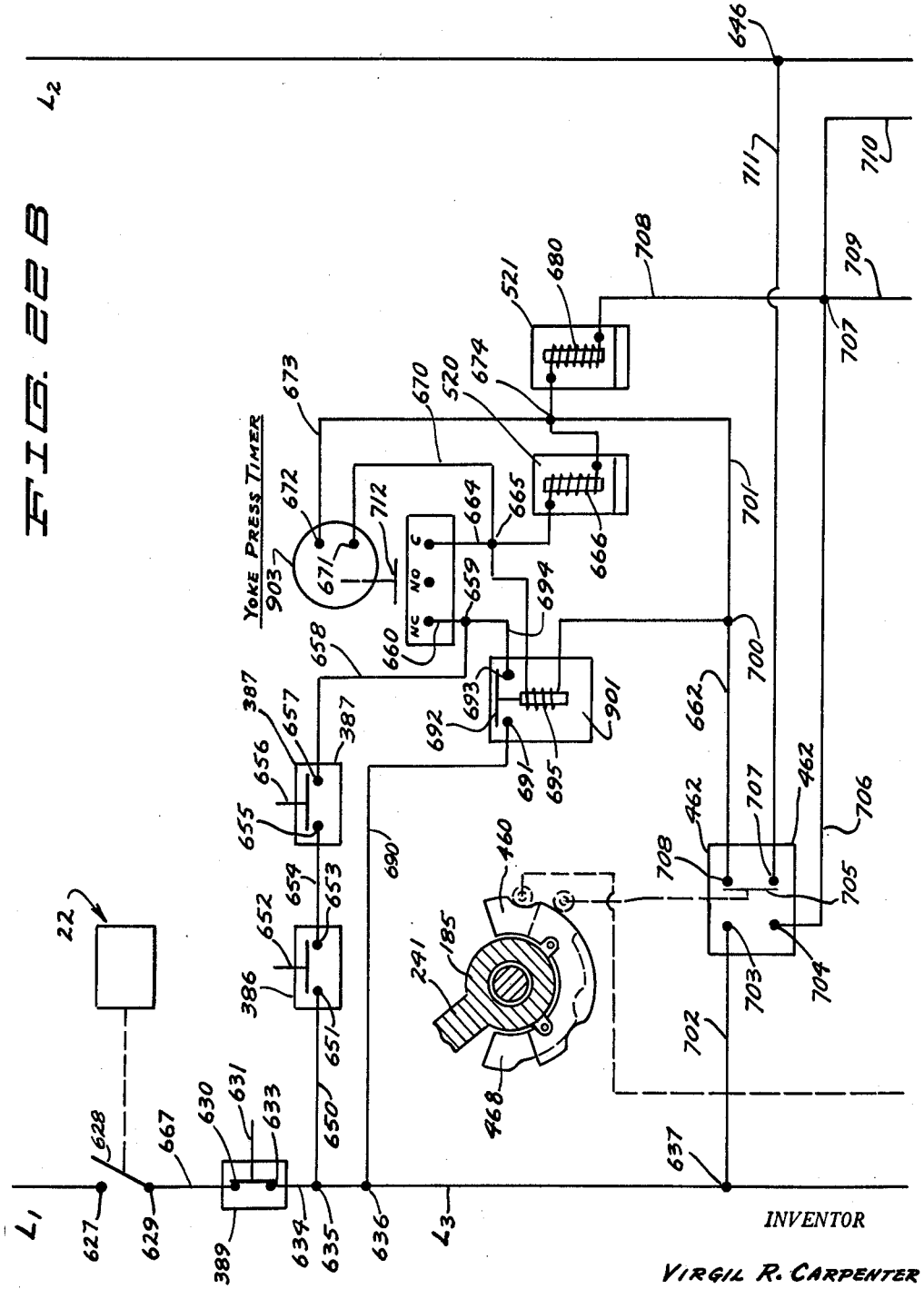

3,070,268
MULTIPLE BUCK ONE-LAY BOSOM PRESS
Virgil R. Carpenter, St. Paul, Minn., assignor to The Unipress Company, a corporation of Minnesota
Filed May 25, 1959, Ser. No. 815,504
57 Claims. (Cl. 223—57)

This invention relates to new and novel improvements in apparatus for the pressing of men's shirts. More particularly this invention relates to improvements in apparatus for pressing the body portion of a garment such as men's shirts wherein there is provided a pair of spaced bucks which are alternately transferred between the loading station and the pressing station.

An object of this invention is to provide new and novel improvements in apparatus for pressing articles of clothing such as men's shirts. A further object of this invention is to provide new and novel improvements in apparatus for pressing an article of clothing such as a man's shirt which is designed to allow a second article of clothing to be dressed onto a buck assembly at a loading station while a first article of clothing is being pressed at a pressing station.

A still further object of this invention is to provide a new and improved transfer arm assembly for a pressing machine having a loading station and a pressing station. A still further object of this invention is to provide a shirt pressing machine having a new and improved transfer arm buck support assembly that supports a pair of bucks in spaced relation and moves each of the bucks through a generally semi-eliptical path to by-pass one another in traveling between a loading station and pressing station. Still another object of the invention is to provide for a pressing machine having a loading station and a pressing station, new and improved transfer arm buck support assembly having a novel sprocket for controlling the movement of a pair of bucks to bypass one another as they travel between said stations.

A still additional object of this invention is to provide new and improved apparatus for moving a pair of presser heads between a neutral non-pressing position and a pressing position. It is still another object of this invention to provide new and improved apparatus for moving a pair of pressing heads between a non-pressing and pressing position that accelerates and decelerates said heads at a constant rate as said bucks move to said position and that minimizes the shock of said heads in coming to a stop.

A still further object of this invention is to provide a new and improved yoke press assembly for pressing the yoke portions of garments such as men's shirts. Another object of this invention is to provide a new and improved mechanical linkage and operating mechanism for moving a yoke presser head between a pressing position and a neutral non-pressing position wherein the mechanism requires a minimum of space "in back" of the pressing apparatus for said linkages to move through. A still additional object of this invention is to provide new and improved buck structure having new and improved mechanical linkages and actuating means for controlling the tail clamp, the wings and the sleeve support mechanism of a buck on which a garment such as a man's shirt is dressed and pressed.

A further object of this invention is to provide an improved single lay bosom and back press machine for pressing shirts, said press being fully automatic and requiring only loading and initiation of the operation of the yoke press and the transverse mechanism after which the pressing function is carried out automatically in a sequence of steps. Still an additional object of this invention is to provide new and improved controls for a pressing machine of the aforementioned character. Still another object of this invention is to provide new and improved interlocking controls having new and novel safety features.

It is still another object of this invention to provide a more efficient multi-buck single lay bosom press machine having new and novel control features which are constructed so as to be relatively easy to maintain. Other and further objects of the invention are those inherent in the invention herein illustrated, described in the claims, and will be apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by reference to the drawings in which the corresponding numerals refer to the same parts and in which:

FIGURE 1 is a vertical front elevational view of the pressing machine of the invention wherein one of the bucks of said machine is shown at the loading station with a shirt dressed on said buck and the safety door is in an extended position;

FIGURE 2 is a plan view of the pressing machine of this invention, said view illustrating one of the bucks at the loading station and the other buck at the pressing station with the presser heads in a press position, there being a shirt dressed on each buck;

FIGURE 3 is a vertical front elevational view of the pressing machine of the invention with the front panels removed and the safety door in a retracted position;

FIGURE 4 is a vertical rear elevational view of the pressing machine of the invention, said view showing the machine with the rear panel and part of the paneling on each side removed to illustrate mechanism located at the pressing station;

FIGURE 5 is a vertical end elevational view of the pressing machine of the invention, said view showing the yoke press ina pressing position in solid lines and in the neutral non-pressing position in dotted lines, said view illustrating the buck without a shirt dressed therein and also showing the safety door in a retracted position;

FIGURE 6 is an enlarged vertical fragmentary front elevational view of the mechanism located at the pressing station, said view showing a presser head, a squeeze cylinder and the mechanical linkage for operating said presser head in a neutral position in solid line and certain mechanical linkage members in a pressing position in dotted lines;

FIGURE 8 is a simplified horizontal fragmentary sectional view of the presser heads, squeezing arms, cam and cam follower mechanism illustrated in FIGURE 7, said view illustrating said mechanism in a neutral non-pressing position;

FIGURE 9 is a simplified horizontal fragmentary sectional view of the mechanism illustrated in FIGURE 8, said view showing said mechanism in an intermediate presser head closing position;

FIGURE 10 is a simplified horizontal fragmentary sectional view of the mechanism illustrated in FIGURE 8, said view showing said mechanism in a final press position;

FIGURE 11 is an enlarged horizontal top view of the buck support-transfer arm assembly, there being portions of said view broken away to illustrate the gears for rotating the bucks;

FIGURE 12 is a vertical sectional view through the buck support transfer-arm assembly with fragmentary portions of the buck structure being shown thereon, said view being generally taken along the line and looking in the direction of the arrows 12—12 of FIGURE 11;

FIGURE 13 is a plan view of the parabolic control sprocket which controls the rotating motion of a buck assembly as said assembly is transferred between the loading and pressing station;

FIGURE 14 is a top view of the buck support-transfer arm direction and location control switch assemblies and the mounting thereof, said view being taken along the line and looking in the direction of the arrows 14—14 of FIGURE 12;

FIGURE 15 is an enlarged fragmentary top view of the safety door and the mechanism for moving said door between an extended buck transfer position and a retracted buck loading position, the extending position being shown in dotted lines and the retracted position in solid lines;

FIGURE 16 is a fragmentary front vertical elevational view of the mechanism illlustrated in FIGURE 15 wherein the door is shown in an extended position, there being a portion of the front panel broken away to illustrate the mounting of the safety door cylinder;

Figure 18:
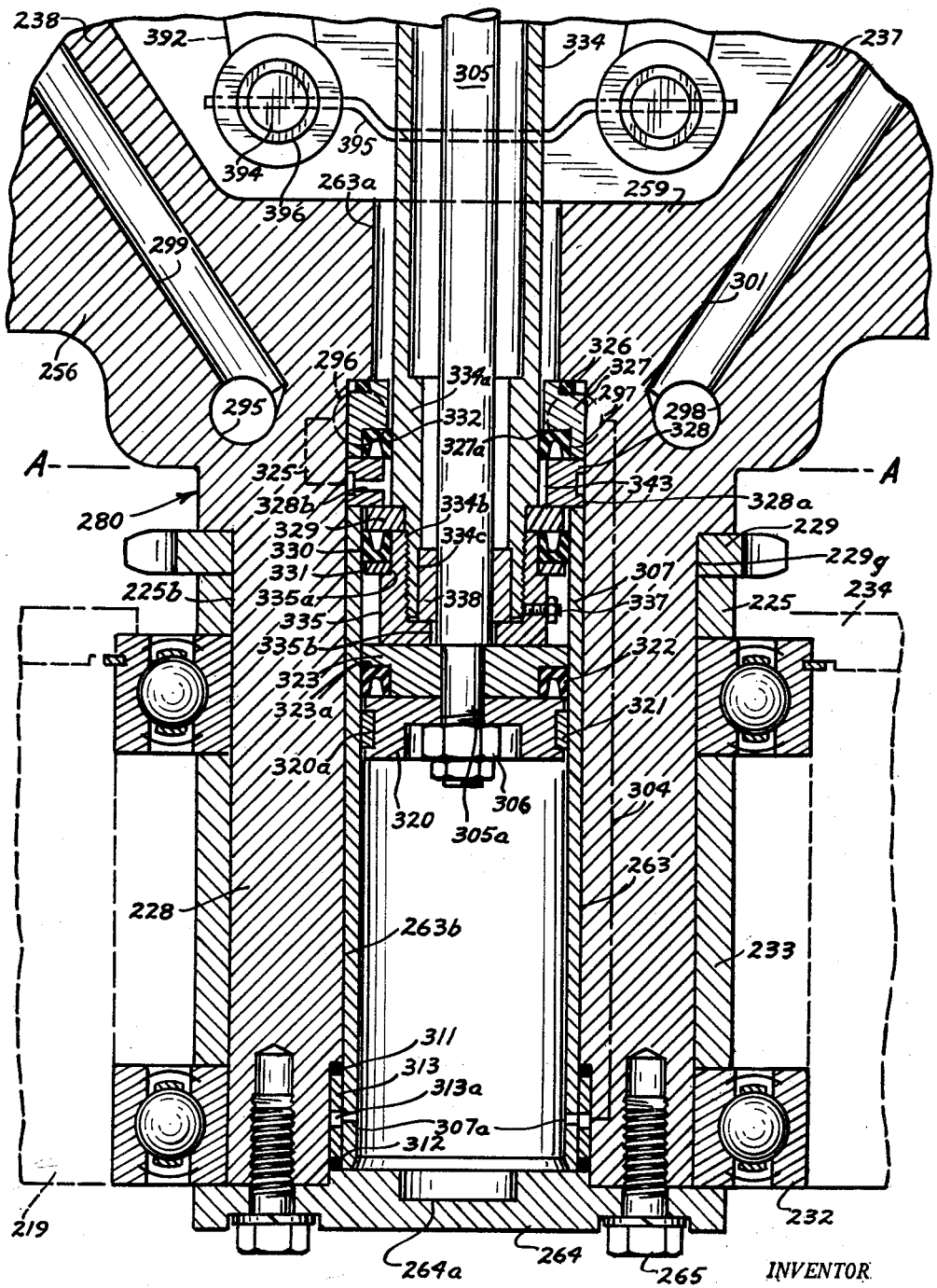

FIGURE 17 is an enlarged vertical sectional view of the buck assembly, said view being taken along the line and looking in the direction of arrows 17—17 of FIGURE 5 to illustrate the details of the wing and sleeve support operating mechanism, said view illustrating in solid line the wings and sleeve support in a retracted position, and in dotted lines the path of movement of said wings from a retracted position to an expanded position;

FIGURE 18 is an enlarged view of the portion of FIGURE 17 which is generally located at a lower elevation than the line A—A, said view illustrating the details of the buck shaft cylinder having the piston therein shown in an elevated position;

FIGURES 19A and 19B, raised one above the other with the center lines aligned and with FIGURE 19A at the top and 19B at the bottom, form a composite enlarged transverse sectional view of a buck mechanism of this invention having a collar clamp assembly mounted thereon, the meeting line between FIGURE 19A and FIGURE 19B being the line X—X, said views being taken along the line and looking in the direction of the arrows 19A and 19B of FIGURE 3;

FIGURE 20 is a top view of the transfer arm-buck support mechanism of this invention, said view illustrating bucks mounted on the transfer arm and the path of travel of said bucks between the loading and pressing stations;

FIGURE 21 is a schematic illustration of the air control valves and air control circuits of the pressing machine of this invention, said view showing in an illustrative manner the various cylinders of the pressing machine together with the mechanism operated by said cylinders;

FIGURES 22A and 22B are a schematic diagram of the electrical circuitry and in part illustrate the mechanism which actuates some of the electrical components. The figures are to be arranged so that FIGURE 22B is placed above 22A and lines L1, L2 of FIGURE 22B form a combination of lines L1, L2 respectively of FIGURE 22A.

Throughout the drawings corresponding numerals refer to same parts, those numerals having lead lines provided with an arrowhead generally designated a plurality of elements which form a sub-assembly or an operating unit of the machine.

For purposes of facilitating the description of this invention, when the position of the buck assemblies are such that they are at their outermost position at the loading station and pressing stations respectively, the yoke presser head is in its uppermost vertical position, the body presser heads are at their outermost position relative to the buck located at the pressing station, and the aforementioned members are in a stationary condition, the pressing machine will be considered to be in a "neutral" and/or "non-pressing" position.

Also for the purpose of describing the machine of this invention, it will be considered that the machine has a "longitudinal axis" L—L (FIGURE 2) which extends in a horizontal plane lengthwise of the machine, a "transverse axis" T—T which extends in a horizontal plane and perpendicular to said longitudinal axis, and a "vertical axis" V—V that extends in a vertical plane perpendicular to the other two axes. Each of the assemblies of the machine will also be considered to have the aforementioned axes, the axes of the assemblies which most nearly correspond (are most nearly parallel to and lie in the same plane) to the machine axes will be referred to by the same terminology as are the machine axes.

Further in order to simplify the present specification it will be assumed that reference is made to the application Ser. No. 508,142, filed May 15, 1955, now U.S. Patent 2,834,523, and to application Ser. No. 584,751, now U.S. Patent 2,875,929, the whole of the two said patents being corporated herein by this reference. The exemplified embodiment of the present invention thus embodies features of construction of the machines covered by the aforementioned patents plus novel features herein described.

Referring now in particular to FIGURES 1 and 3, the pressing machine of this invention, generally designated by reference numeral 10, is considered to have a "loading station" shown generally under the bracket 13, at which a shirt 21 may be loaded upon and removed from an upright buck structure generally designated 15; and a "pressing station," shown generally under the bracket 15, at which a shirt is dressed upon the second buck, generally designated 16, and is pressed while the first buck 15 is being loaded. A yoke press assembly, generally designated 18, is located at the loading station for pressing the yoke portion of a shirt dressed on buck 15 prior to the time the "dressed" buck 15 is moved by the buck support transfer arm assembly, generally designated 17, to the pressing station where the body portion of the shirt is pressed by the body press assembly which is generally designated 19. Control mechanism, generally designated 20, is provided for controlling the sequence of operation of the various members of the pressing machine of this invention, said control mechanism including the machine control panel 22 located at the pressing station and the machine switch panel 37 located at the loading station.

*Frame.*—A cabinet, generally designated 38 is provided for enclosing a major portion of the buck support-transfer arm assembly and the body press assembly. On the frame, generally designated 12, there are mounted the panel portions forming the cabinet and the above mentioned structural assemblies.

The cabinet 38 is provided with a buck opening 40 in the left side wall 45 of the pressing station, a second opening 42 in the table 43 and a third opening 41 in the top wall 44 of the cabinet, said second and third openings forming a continutation of the opening 40. The aforementioned openings 40, 41 and 42 are provided to permit the buck assemblies 15 and 16 to be transferred between the pressing and loading stations.

The cabinet 38 also includes the end panel 39 having side flanges and top flange 39a, and left hand front and back panels 46. The aforementioned panels are removably secured to the frame by conventional means such as machine screws 47 while the top flange 39a is secured to the table to help support said table. The portions of the cabinet structure located at the pressing station include the side wall 45 which is made up of a pair of spaced panels 45a, a rear panel 58, front and back door panels 49, right hand front and back panels 50 and the top wall panel 44 which has depending reinforcing flanges 44a. These panels, except for the door panels, are removably secured to the frame by fasteners such as machine screws 47. A door 53 is hingedly secured on the right hand front panel by hinges 54 to provide access to control structure to be described hereinafter. A latch 55 is provided which releasably retains the door in a closed position.

The door panels 49 are hingedly secured to the respective front and back panels 50 by hinges 54. Each of the door panels is provided with latch members 51 for releasably retaining the door panels in a closed position.

A safety door 48 is mounted on the side wall 45 to move between a retracted position (FIGURE 3) in which it allows the operator free access to the buck located at the loading station, and an extended position (see FIGURE 1) to protect the operator from injury as the bucks are transferred between the loading station and the pressing station. The structure of the safety door and the mechanism for operating said door will be set forth in greater detail hereinafter.

The frame 12 includes longitudinally extending front and back sills 24 which are held in spaced parallel relationship by a plurality of parallel spaced, transversely extending members that include the end angle iron 25a, rear angle iron 25b, intermediate angle iron 25c, side wall channel iron 26a, intermediate channel iron 26b and the horizontal support member 27 which is secured in spaced relation to the sills by angle bracket 36 (only one being shown). The mounting brackets and the end and rear angle irons are secured to the floor or mounting base by conventional means such as nuts and bolts (not shown). A vertical table support member 60 is secured to each of the end portions of the support 27, the upper end of members 60 being secured to the table to support said table. The upright posts 29 also aid in supporting the table, the outer transverse ends of the side walls being bent and shaped to extend in a downward direction below the level of the side panels and the table where they are secured to the channel iron 26a.

An upwardly extending short post 28 is secured to the rear end portions of each of the sills 26. Intermediate each of the short posts 28 and the upright posts 29 is a vertical brace 30, each of the vertical braces being secured to the respective opposite end portions of the rear angle iron 26b.

A top brace 35 is secured at its opposite end portions to the upper ends of the vertical braces 30. A pair of spaced longitudinally extending horizontal intermediate braces 31b are connected at their respective ends to the upright posts 28 and to the vertical braces 30. A second pair of spaced intermediate braces 31a are joined to the vertical braces 30 and at their opposite ends to the shot vertical braces 32 which in turn extend downwardly and are connected to the top adjacent to posts 28. As may be noted in FIGURE 7 each of the intermediate braces are secured to the center brace 30 by angle iron 33.

Referring to FIGURES 3, 4, 6, and 7 a pair of spaced, transverse base bars 70, 71 are secured at their respective end portions to the upper ends of post 28. An M-frame 64 composed of a pair of channel members joined to form the V-shaped portion 64a and channel members 64a joined to the portion 64b to form the outer legs of the M-frame are mounted to have the apex of the V-portion and one end of the legs 64a secured between the base bars 70, 71. The M-frame is mounted to incline upwardly and inwardly from the short posts where one end of the legs 64a is secured to have the opposite end of said legs secured to the central portion of vertical posts 30.

A pair of transversely extending plates 68, 69 are welded to the M-frame to extend parallel to the base bars 70 and 71 midway between vertical braces 30 and short posts 28, the elongated plate 68 being secured to the top of the M-frame and the elongated plate 69 being secured to the bottom of the M-frame. A generally triangular shaped frame 67 is mounted to overlay the M-frame, the bar forming the base of said triangle being the aforementioned base bar 70 and the portion being secured to the elongated plate 68. A second triangular shaped frame 66 which is of similar construction to the aforementioned triangular frame 67 includes the base bar 71 and has the apex portion thereof welded to the elongated plate 69. The aforementioned triangular shaped frames and M-frame form structure upon which to mount the mechanism for operating the presser heads and to withstand the tremendous forces resulting from the operation of the machine when a shirt is pressed, it being noted that most of the frame members of the machine are either constructed from heavy steel bars, heavy angle iron or from heavy iron channel to form a very rugged frame.

Figure 7:
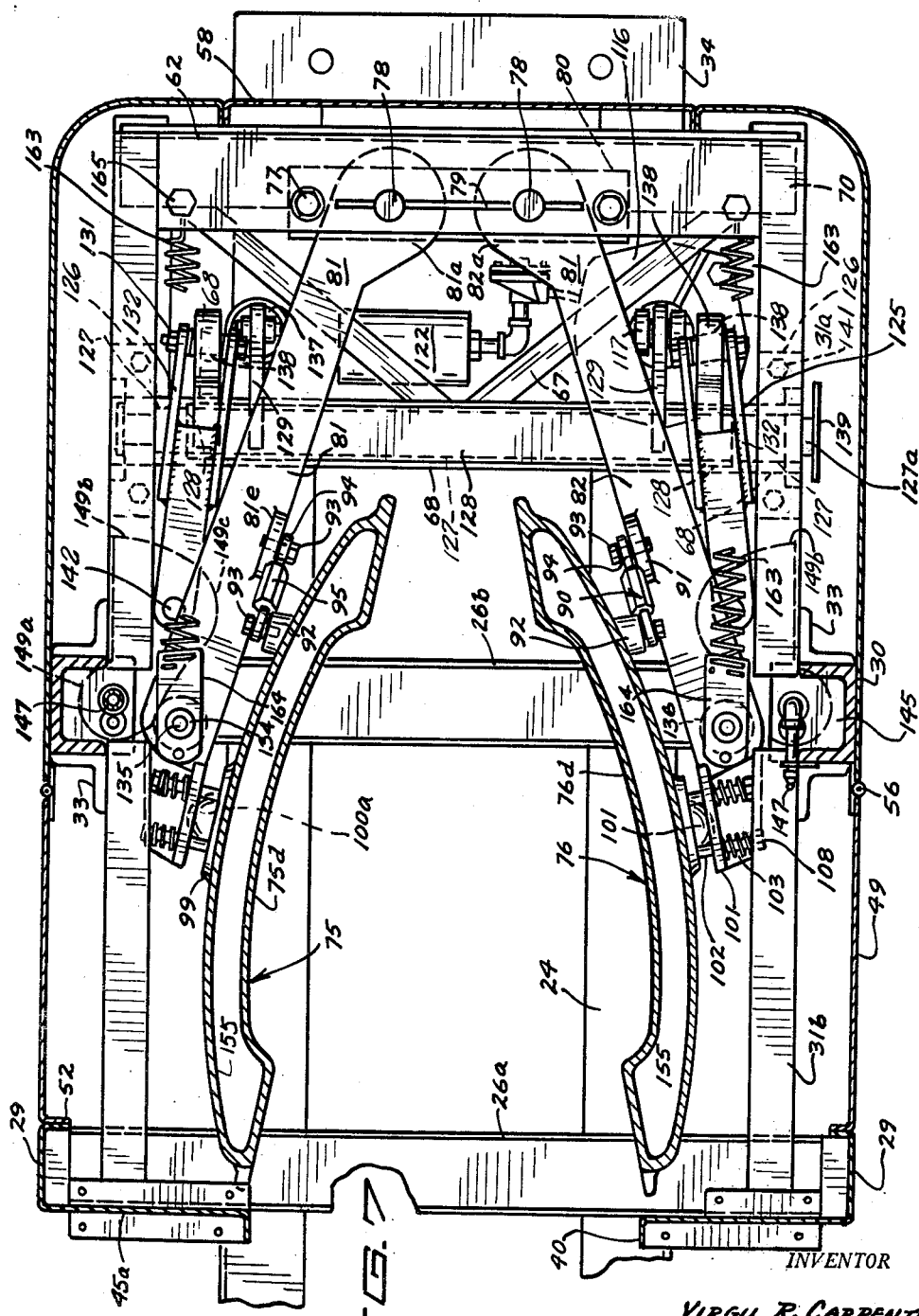
FIGURE 7 is an enlarged horizontal fragmentary sectional view taken along the line and looking in the direction of the arrows 7—7 of FIGURE 6, said view showing the presser head mechanism in a neutral non-pressing position.

*Body Press Mechanism.*—A pair of cooperating opposed pressing heads generally designed 75 and 76 respectively are pivotally mounted on one end of their respective squeeze arms 81 (see FIGURES 6 and 7). The opposite end of each of the squeeze arms, which are shaped to form clevis 81a, is mounted between and supported by the spaced transversely extending top and bottom presser arm support members 62, 63 which are secured at their opposite ends to the upper end of short vertical braces 32. The squeeze arm mounting mechanism 85 includes the aforementioned support members 62, 63 and a pair of spaced vertically extending squeeze arm shafts 78 which are extended through appropriate apertures formed in the support members 62 and 63, the shafts being located close to and on opposite sides of the longitudinal axis of the machine. A rod 79 (see FIGURE 7) is extended through diametrically extending apertures formed in the upper end portions of each of the shafts 78 and bears on the top member 62.

Mounted between and in spaced relation to the support members 62, 63 is a horizontally extending vertical alignment bar 80, said bar being located more closely adjacent to the top member than said bottom member. The alignment bar is retained in an adjusted vertical position by spaced cap screws 77 extended through the top support member and threaded into opposite ends of the alignment bar. By turning the cap screws in the appropriate direction the alignment bar is moved in a vertical direction and thus provides an adjustment to vertically align the presser heads.

To mount the clevis of each squeeze arm on the aforementioned mounting mechanism 85 the squeeze arm may first be placed in position and then the shaft 78 is extended downwardly through the top member 62, thence through the upper leg of the clevis 81a, a spring lock-washer bearing assembly 84, the alignment bar 80, the spacer 83, a second spring lock-washer bearing assembly 84, the lower leg of the clevis and finally through the bottom support member 63. The vertical forces resulting from the weight of each presser head and the squeeze arm are largely transmitted through the upper clevis leg to the upper spring lock washer assembly 84 which in turn bears on the vertical alignment bar that supports the weight of the presser head and the squeeze arm. The upper and lower legs of the clevis 81a are spaced a substantial distance from one another to prevent the respective bearing assemblies from binding on the shaft 78 as it pivots thereabout.

Formed on the outer central mid-portion of each presser head is a generally rectangular boss 99 having an outwardly extending hemispherical bearing 100. A pivot plate 101 having a rounded recess 101a for seating the outer end portion of the bearing 100 is formed integral with the adjacent end of the squeeze arm. The pivot plate 101 is secured to the boss by bolts 108 which are threaded into appropriate apertures formed in the corner portions of said boss. A spring 103 is mounted between the head of each bolt 108 and the pivot plate to urge said plate in a direction toward the pressing head while the hemispherical bearing pivotally spaces the rectangular boss from said plate. The aforementioned mounting of the presser heads permits said heads to adjust to substantially conform with a buck assembly even though there is some misalignment.

Formed integral with the side of the pivot plate opposite the recess and on either side thereof and also integral with the end portion of the squeeze arm is a pair of spaced horizontal reinforcing portions 81d. The reinforcing portions form a continuation of the horizontal reinforcing flanges 81b of the squeeze arm.

A turnbuckle assembly 90 is secured at one end to the mid-porton of the squeeze arm by a bolt 93 inserted through an eye bolt 94 of the turnbuckle 95 and threaded into an offset 81e formed on the mid-portion of the squeeze arm. A second bolt 93 is extended through an eye bolt 94 at the other end of the turnbuckle and threaded into a protuberance 92 formed on the presser head intermediate the boss 99 and the offset and at a higher elevation than the boss and the offset. The turnbuckle assembly provides means to vertically align the presser head while at the same time forming a relatively loose connection between said presser head and the squeeze arm to permit limited two-way rocking movement of the presser head relative to the squeeze arm to which it is connected.

The actuating mechanism 115 for moving the presser head between pressing and neutral position (see FIGURES 6 and 7) includes a large diameter squeeze cylinder 116 having a projection 123 on the lower end through which the cylinder is pivotally connected to a heavy pivot bracket 118 by a pivot pin 120. The pivot bracket in turn is secured to the intermediate angle iron 25c (see FIGURE 3) by appropriate means such as bolts 119. The cylinder is fluidly connected to a quick opening exhaust 122. Within the cylinder is a heavy piston connected to the piston rod 124, there being a coil spring 121 mounted on the piston rod intermediate the cylinder and the annular flange 124a formed on the upper end of the piston rod to cushion the return of the presser head actuating mechanism to a neutral position.

An upright bar 117 is connected at one end to the flange 124a and pivotally connected at the other end to the crank arm assembly 125 by the crank arm pivot 131. The aforementioned crank arm assembly includes a pair of crank bearing blocks 126, there being one crank bearing block spaced above each straight leg 64a and bar 68 by spacers 140, said blocks being secured to the M-frame by bolts 141.

A crank shaft 127 is journalled for rotation in the bearing blocks and extends outwardly beyond the front bearing block at 127a to have the switch plate 139 mounted thereon. Keyed on the crank shaft intermediate the bearing blocks is a sleeve 128 having a pair of spaced parallel radially extending crank arms 129. The outer end of the front crank arm 129 is pivotally connected to the aforementioned upright bar 117 by the pivot 131.

Secured to the sleeve 128 adjacent to each crank arm to extend radially outwardly from the sleeve at an angle approximately 90° to the crank arms is a linkage arm 138. Mounted in the outer end of each linkage arm 138 is a linkage arm bearing 130 which in turn mounts the linkage arm pivot 131 to have a pivotal axis that is skewed relative to the pivotal axis of the crank shaft 127. The linkage member 132 is pivotally connected at one end to the linkage arm 138 by the aforementioned pivot 131 and at its opposite end to the enlarged portion of the cam 149 by the cam linkage pivot 142. The linkage member 132 is made up of a pair of spaced parallel bars 132a having linkage arm 138 mounted therebetween and a second pair of elongated spaced parallel bars 132b having the cam mounted therebetween. The adjacent end portions of the bars 132a, 132b are joined to form an open ended box-like structure. Through the aforementioned connections, a single rigid member pivotally connects the cam, which has a vertical pivotal axis, to the linkage arm which has a horizontal pivotal axis.

The outer end of the back crank arm 129 is pivotally connected by the pivot connection 131 to the upper end of the coil spring 137, said spring always being in tension. The lower end of the coil spring 137 is formed as a threaded rod 114 which extends through an aperture in angle iron 25c and has adjustment nuts 114a threaded on the lower end to facilitate adjustment of the spring tension and replacement of the spring.

A pair of coil springs 163 are provided for constantly urging the presser heads to the "neutral" position, each coil spring being attached at one end to a spring bracket 164 which is pivotally mounted on the cam follower pivot 135 and attached at the other end to a spring mounting bolt 165 which is threaded in the outer end of the support 62. Due to the various linkage connections, the coil spring 137 has the best mechanical advantage in urging the presser heads to a neutral position when the presser heads are near a press position while the coil spring 163 has the best mechanical advantage when the presser heads are adjacent the neutral position. The springs 137, 163 operate to return the presser heads to a neutral position and to move the squeeze arm piston to a "down" position to exhaust the air from the squeeze cylinder once air is no longer being applied to the cylinder.

A cam mounting block 145 which is generally T-shaped in horizontal cross section and has a horizontal cam slot 146 cut out of the center portion thereof is mounted in the channel portion of each of the vertical braces. The cam pivot 147, which includes a lubrication fitting, pivotally retains the rounded end 149a of the cam 149 in the cam slot, the cam 149 being generally shaped as shown in FIGURE 7 to have the enlarged end 149b, the smaller round end 149a and a cam surface 149c.

Each of the vertically extending cam follower shafts 135 are pivotally mounted in a pair of cam follower bearings 134 there being a bearing mounted in each of the mid-portions of the top and the bottom reinforcing portions 81d. A cam follower 136 is rotatably mounted on each of the cam follower shafts intermediate the reinforcing members to bear against the cam surface 149c of the adjacent cam 149. The cams 149 are shaped so that as they are rotated to cause the presser heads to move between a neutral and a pressing position the presser heads will accelerate and decelerate slowly and move rapidly in the central portion of the path of movement. As a result the shock of sudden "starts" and "stops" of the presser heads is substantially eliminated.

With the exceptions pointed out herein, the structure of the presser head 75, 76 is generally of the same construction as the presser heads disclosed in the United States Patent 2,834,523 to Maxwell et al. and therefore will not be described in detail. The main differences in structure of the presser head of the present invention from U.S. Patent 2,834,523 are the means for pivotally mounting said presser heads which have been described heretofore, the steam and condensate return connections to the presser heads and the shape of the upper portion of said presser heads. The inner surface portions 75d, 76d of the presser head generally conform to the surface of the buck and the wings of said buck which said presser head bears against in a pressing position except that the front presser head 76 has a downwardly curved notch at 76a to avoid pressing against the collar of the shirt and the collar clamp mechanism 292 and that the curved edge portions 75c, 76c of the presser heads slope downwardly to the respective sleeve cut-outs 75b, 76b. By providing the aforementioned curved upper edge portions 75c, 76c, the pressing action of the bucks and the heads overlaps the area which has been previously pressed by the yoke press. The pressing action of the pressing heads is generally the same as that depicted in U.S. Patent 2,834,523 and therefore will not be further described except as necessary to set forth the operation of the machine of the present invention.

Each presser head 75, 76 is provided with a steam chamber 155 into which steam under pressure can be introduced. The steam line 156 includes a T-joint 157 and an elbow 158 spaced from the T-joint for conducting steam into both sides of the upper end portion of the chamber. A condensate return line 159 is connected to the condensate outlet port 160 to drain the condensate from the lowermost portion of the steam chamber. The steam and condensate lines are of wire braid reinforced flexible material so as to allow necessary movement of the presser heads without deterioration of the lines.

*Buck Support-Transfer Arm Assembly.*—The buck support-transfer arm mechanism, generally designated 17 includes a mounting base 176 secured to the front and back sills 24 by nuts and bolts 180 (see FIGURES 11, 12, and 13). The aforementioned mounting base is made of a heavy steel plate having a frusto-conical portion 178 depending from the bottom center portion. A main shaft aperture 182 is formed in the mounting base to fixedly mount the main shaft 181, said shaft extending upwardly through the gear box aperture 186 to rotatably mount the gear box assembly generally desingated 175. The gear box assembly includes a heavy steel bar 202 rounded at the outer ends and an elongated open top gear box 184 formed integral with the top of said bar, said box having generally parabolic end portions 187 that are closed at the top by cover plates 189 welded to the side wall of the box. A cover plate 188 is removably secured to the box by bolts 205 to close the top opening 203 of said box. The bar 202 includes a depending annular flange 185 formed integral with the mid-portion thereof to space the gear box above the mounting base 176, the aforementioned gear box aperture extending through the flange 185. A bearing 179 is mounted on the main shaft in the enlarged portion of the aperture 186 to rotatably space the annular flange on the mounting base.

The main shaft extends into the gear box and thence through a thrust washer 190 to have a main drive gear 194 keyed on said shaft by the gib key 192, there being a cap screw and washer 195 for retaining the gear on the shaft. An axially extending bearing 199 is mounted on the main shaft intermediate the thrust washer and the enlarged portion 181a of the main shaft.

Rotatably mounted in the gear box diametrically across the main drive gear to be driven by said drive gear are a pair of intermediate gears 196. Each intermediate gear is mounted on intermediate gear bearing members 198 which in turn are mounted on an annular shaft 200 and in part retained in the shaft by washer 204. The annular shaft is mounted in appropriate aperture formed in the bar and is secured therein by a cap screw 195 threaded in said bar.

Fixedly mounted in each of the end apertures 211 formed in the rounded ends of the heavy bar to extend upwardly through aperture 206 is a vertical buck control shaft 209. A buck control sprocket 210 is keyed on the upper end of the shaft while intermediate the bottom of the gear box and said sprocket is an elongated sleeve 219 rotatably mounted on said shaft. A buck drive gear 201 is keyed on the lower end of the sleeve to be driven by the adjacent intermediate gear. A retainer bearing 222 is mounted in the lower end of the sleeve on shaft 209 and a bearing 221 is mounted on the upper end of the shaft adjacent the sprocket 210.

A ruggedly constructed buck support arm 215 is mounted on the upper end sleeve 219, said sleeve keyed in the aperture 224 formed in one end of the arm by key 223. A larger aperture 230 is formed in the opposite end of the buck support arm for mounting the vertically extending combination buck cylinder-shaft 228 of the second buck 16 therein. The buck cylinder shaft is retained in the aforementioned aperture by a pair of retainer bearings 232 spaced by a spacer 233 and an annular retainer ring 234 which is held in place by bolts 235. A parabolic shaped buck control sprocket 229 is mounted on the upper end of the cylinder-shaft and held in position by a spacer plate 225 keyed on the shaft, said sprocket being drivingly connected to the buck drive sprocket 210 by the drive chain 231.

The sprocket 229 is a generally parabolic shaped plate as illustrated in FIGURE 13 and has a large aperture 229g formed in the central portion thereof. The perimetric edges have a plurality of teeth 229a, 229b formed therein with the exception of the corner portions adjacent either end of the base 229h, the base 229h and a straight edge portion 229c which is located directly across the sprocket from the base portion. The aforementioned straight edge portion forms a slightly inclined angle relative to the base.

When the parabolic sprocket is properly mounted on the cylinder shaft and retained in position by a bolt 226 extended through sprocket 229d to be secured to the spacer 225, the base portion 229h is substantially parallel to a vertical plane passed through the longitudinal axis of the buck. Considering the buck 15 to be in the endmost position at the loading station, one end of the chain 233 is pivotally connected to the sprocket by a pivot 214 extended through the aperture 229e. The chain extends from said pivot 214 over the teeth 229a and adjacent to the intersection of the toothed portion 229a and the straight edge and thence around the buck drive sprocket 210 to be connected at its other end to the parabolic sprocket by a pivot 216 which is mounted on the pivot aperture 229f. The purpose of providing the parabolic sprocket will become apparent hereinafter.

Attached to the undersurface of the heavy steel bar 202 and extending partially around the depending annular flange 185 are horizontal cams 460, 468, said cams being secured to said bar by conventional means such as bolts 470 threaded into the heavy bar (see FIGURE 14). The cams are mounted such that the direction cam 460 abuts against the heavy bar and the transfer arm position cam 468 abuts against the direction cam. The direction limit switch assembly 461 is mounted on the mounting base 176 in front of the longitudinal axis adjacent to the depending flange. A switch arm 457 which is pivotally secured at one end to the direction switch assembly by pivot 466 and has a cam follower 458 pivotally secured to its opposite end holds the cam follower 458 in engagement with the vertical surface of the direction cam. When the transfer arm buck support assembly has been pivoted in the direction of the arrow 950 to the endmost position, the cam follower 458 will be positioned in the notch 460b to cause the switch arm 457 to move the switch contact member 744 to make an electric connection between switch terminals 740, 741 (see FIGURE 22A).

When the transfer arm buck support assembly is pivoted in the direction of the arrow 951, the cam follower 458 will move out of the notch 460b onto the curved surface 460c and thus cause the switch arm to move the switch contact member to an "off" position. When the transfer arm has moved to reach its endmost counterclockwise portion (arrow 951), the cam follower 458 will rest in the notch 460a and move the switch contact member 744 to complete an electrical connection between the directional switch terminal 742 and 743.

Secured to the mounting base on the opposite side of the longitudinal axis from the transfer arm direction limit switch 461 is a transfer arm position limit switch assembly 462 that includes a switch arm 464 pivotally mounted at one end on the switch box by a pivot 463. The switch arm is resiliently urged in the direction of the arrow 952 to hold the cam follower 465 which is pivotally mounted on the opposite end of said arm by pivot 467 in contact with the vertical surface of the position cam 468. The cam 468 has a radially extending offset portion 468a at one end thereof and a radially extending offset portion 468b at the opposite end. A notched-out portion 468c is formed in the outer peripheral surface 465d of the cam midway between the offset portions 468a and 468b. The angular lengths of each of the cams 468 and 460 and the location of the offset portions 468a, 468b are chosen so that when the cam follower 468 rests in the notch 460b, the cam follower 465 bears against the cam offset portion 468a and thus moves the switch arm 464 to position the switch contact 705 to make an electrical connection between the end switch terminals 707 and 708 (see FIGURE 22). With the cam follower 465 moved into notch 460c, the switch arm 464 moves the switch contact 705 to make an electrical connection between terminals 703 and 704.

Rotating the transfer arm in the direction of arrow 951 the cam 460 is moved so that the switch cam follower 465 bears against the curved surface 468c and the switch contact 705 opens the electrical connection between the terminals 707 and 708. By rotating the transfer arm to a position where a cam follower 465 is positioned in the notch 468c the switch arm 464 moves the switch contact 705 to make electrical connection between the center switch terminal 703 and 704. At this time the direction switch cam follower 458 bears against the curved surface 460c and as a result the switch contact 744 is then in an "off" position. However, when follower 458 is moved into notch 460a, the switch contact 744 is moved to make an electrical connection between terminals 742 and 743.

The transfer arm buck support assembly having been described, the mechanism for rotating the transfer arm will now be set forth. The transfer arm drive assembly, generally designated 240 (see FIGURE 11) includes a cylinder 247 having one end thereof pivotally secured to one end of the rectangular alignment bar 249 by a cylinder pivot 245. The opposite end of the alignment bar is pivotally secured in the channel portion of the U-shaped alignment bracket 250 by the pivot bolts 253, said bracket being secured to the mid-portion of the channel iron 26a. A horizontal alignment bolt 252 having a lock nut 254 is threaded into an appropriate aperture formed in each of the vertically extending legs of the U-shaped bracket to bear against the respective adjacent vertical surface of the alignment bar while a vertical alignment bolt 251 is threaded into said bar to bear against the web of said bracket. By providing the aforementioned alignment bar and the means for adjustably positioning said bar, the pivotal axis of the cylinder may be positioned to insure that the transfer arm is moved through an arc to locate each of the buck assemblies at the same location at the end of the piston stroke and to compensate for misalignment of the frame.

Located in the cylinder 247 is a piston having a piston rod 246, the opposite end of the piston rod from the piston being adjustably threaded into the pivot block 242 to form means to adjust the length of the piston stroke. The pivot block is pivotally mounted in the clevis 241 by pivot 243. The clevis may be integrally formed with the gear box and depending flange to extend radially outward from said flange in a direction perpendicular to the longitudinal plane of said gear box.

*Buck Assembly.*—For the most part, the structure of only the buck assembly 16 will be described since each buck is generally identical in construction. The buck 16 is generally rectangular in vertical cross-section except for the upper portion which is slightly curved. Each buck is made of two spaced nearly identical half-frame sections, there being a front section 265a, a back half section 265b, a yoke buck member 280 and the generally Y-base member 288 (see FIGURES 5, 17, 18, 19A and 19B). The structure connecting the two aforementioned half sections and the structure located between will be set forth hereinafter. Each of the half sections has a curved outer plate (269a, 269b) the curvature of said plates being in a horizontal plane. A generally rectangular inner plate 269 having vertical inwardly turned flanges (not shown) and top spacer wall 319 and bottom spacer wall 324 welded to said inner plate are connected to the inner surface of each of the curved inner plates 269 to form a steam chest cavity 271 between the curved plate and inner plates.

The two half sections of the buck are covered as one unit with a resilient padding and buck cover 266 with the exception of an elongated slot 273 which is provided at either side of the buck cover to have the wings 290 and sleeve supports 291 extend outwardly therethrough, a collar clamp opening 268 formed at the upper central portion of the cover to have the collar clamp 292 extend therethrough, an open bottom 272 and an elongated tail clamp slot 273 formed in the lower front central portion of the cover and spaced upwardly above the bottom opening. The wings 290 are also covered with a resilient padding and cover 293.

The lower horizontal cross-section of the yoke buck member 280 is generally of the same shape and of slightly larger size than the adjacent outer surface of the plates 269a, 269b on which it is mounted to cap said half sections, said yoke member having a depending perimetric flange 281 which extends downwardly between the two plates to be secured to said plates. The yoke buck member has a central forward hollowed-out portion 287 for mounting the collar clamp 292 therein and is gently sloped longitudinally outwardly and downwardly from the upper edge of said portion 287.

The yoke member is formed with a central hollow cavity which extends substantially the length and breadth of said member to form a yoke stem chest 282. A yoke steam inlet port 283 is located on one side of said member for introduction of steam into said cavity, there being a yoke steam supply line 285 being connected to said port. The yoke condensate return line 286 is connected to the yoke condensate port 284 which is located in the bottom surface of the opposite side of the yoke member.

The Y-shaped base member 288 includes the cylinder-shaft 228 which forms the straight leg portion. The generally V-shaped portion 256 extends upwardly above the line A—A of FIGURE 18 and is generally rectangular in horizontal cross section. The lower ends of the two half sections are secured to the V-portion by bolts 257 that extend through the portions of the inner plates which are located at a lower elevation than the curved plates.

A vertically extending well 263 is drilled to extend the length of the cylinder shaft and upwardly through the flattened apex 259 of the V-portion, said well having a top reduced diameter portion 263a, and an enlarged diameter portion 263b. A cylinder cover plate 264 having a circular recess 264a is attached to the bottom end of the buck cylinder by bolts 265 threaded into said shaft.

Four horizontally spaced openings 295, 296, 297, 298 are drilled in the Y-base member to extend parallel to one another and to be located slightly above the line A—A. As illustrated in FIGURE 18 the opening on the left forms the condensate return port 295 to which the flexible branch condensate line 355 is connected, the opening adjacent thereto forms the top air line port 296 to which the flexible air line 354 is connected, the third opening forms a bottom air line port 296 to which the flexible air line 353 is connected and the opening on the far right forms a steam supply port 298 to which the flexible branch steam line 352 is connected.

A diagonally extending condensate return hole 299 having a plug 303 in the upper end is drilled in the length of the left hand V-leg 238 to open into the condensate port 295 (see FIGURES 17 and 18). Similarly a second diagonally extending hole having a plug 302 threaded in the upper end is drilled in the right V-leg 256b to open into the steam line port 298.

Drilled in the respective V-legs 256a, 256b, are horizontally extending holes 300, 314 that open into the respective diagonal holes immediately below the aforementioned plugs. The horizontal hole 314 is contiguous to corresponding apertures opening into each of the steam chests 271 while the horizontally extending hole in the left hand leg is contiguous corresponding apertures formed in each of the steam chests to drain condensate from said chests. In each of the respective V-legs a longitudinally extending opening (275, 276) is drilled to also open into the upper end of the diagonal holes. An elbow 277 is threaded into the opening 275 to fluidly connect the yoke condensate line 286 to the diagonal hole 299 while the elbow 278 is threaded in opening 276 to fluidly connect the diagonal hole 201 to the yoke steam supply line 285.

Mounted intermediate of the two half sections of the buck are a plurality of vertically spaced bearing blocks 315, 316, and 318 having the respective vertically extending apertures 346, 347, 348 therein. The bearing blocks are secured to the inner plates by bolts 318. The bearing blocks are positioned to have their respective apertures directly above one another and serve to space the half sections to absorb the pressure exerted against said sections and to mount structure to be described hereinafter. As may be noted the top bearing block 315 is spaced slightly downwardly from the yoke member, the intermediate bearing block 316 is spaced about one third of the way down the buck from said yoke member and the bottom bearing block 317 is located about two thirds of the way from said yoke member to the mounting base.

An operating rod 305 having an upper end located beneath the top bearing block slidably extends downwardly through the apertures 347, 348 and into the well 263 to form a piston rod for the cylinder shaft. The reduced diameter end portion 305a formed on the lower end of the operating rod has fixedly retained thereon a piston plate 320 and a seal plate 323, there being a nut and locking nut 306 threaded on the lower end of said rod. The nut fits within the piston plate recess portion while the locking nut fits in the recess 264a when the operating rod is in its lowermost position.

An expander ring 321 is mounted in the piston plate peripheral groove 320a to bear against the cylindrical line 307 which is mounted in the well 263b. An annular shoulder 323a is formed in the lower peripheral portion of the seal plate for mounting a seal ring 322 to bear against the piston plate and the cylinder liner 307.

Slidably mounted on the operating rod to slidably extend from beneath the intermediate bearing block through the bottom bearing block aperture 348 and the reduced diameter portion of the well is an operating tube 334. A top tube cap 340 is secured on the operating tube to position the rod in said tube.

Mounted in the enlarged diameter portion 263b of the cylinder in vertical relationship are the cylinder liner 307 which has the lower edge thereof in abutting relationship with the cylinder cover, an annular air inlet ring 328 bearing against the upper edge of the liner and a spacer ring 327 bearing against the air inlet ring and abutting the shoulder formed at the junction of the reduced diameter cylinder portion with well portion 263a. In annular groove in the lower end of the cylinder aperture there is mounted, in vertical relationship between the periphery of said groove and the liner, a bottom O-ring 312 which bears against the cylinder cap, a bottom air inlet ring 313 abutting against the bottom O-ring and having an air inlet aperture 313a which is contiguous to the air inlet aperture 307a formed in the liner and a second air inlet aperture 313a located diametrically across the ring from the first mentioned air inlet aperture and contiguous to the second air inlet aperture 307a formed in said liner, and an intermediate O-ring 311 located on top of the ring 313. The aforementioned O-rings 311, 312 form seals to prevent air from escaping around the outer periphery of the liner. Formed in the cylinder wall is an air connector line 304 to connect the top air inlet port 297 to the air inlet apertures 313a.

Appropriate holes are drilled in the cylinder casing to form a top air connector line 325 to permit passage of the air from the air inlet port 296 to the peripheral groove 328a formed in the top air inlet ring and thence through the horizontally extending aperture 328b to the surface of the ring 328. The top O-ring 326 is mounted in the annular shoulder formed in the spacer ring to prevent air from escaping upwardly along the inner peripheral wall of the cylinder liner. A top seal ring 332 is mounted in the inner peripheral shoulder 327a of the spacer ring to bear against the operating tube and the inlet ring to form an air seal.

As may be noted in FIGURE 18, the outer diameter of the operating tube is substantially smaller than the inner diameter of the reduced diameter portion 263a. However, it is only slightly smaller than the inner diameter of the spacer ring. The inner diameter of the air inlet ring is substantially smaller than the outer diameter of the operating tube to provide an annular air space 343.

Formed as a lower end of the operating tube to have the upper end thereof adjacent the air space 343 when said rod is in its uppermost position is a reduced diameter end portion 334c. Threaded on the reduced diameter end portion 334c of the operating tube is a bottom pipe cap 335 having an aperture 335b for the operating rod to extend through. A stud 337 having a lock nut is threaded in a pipe cap aperture to lock the cap on the tube. A bottom spacer gasket 338 is mounted in the inner peripheral groove 334c of the tube to space said cap from the lower edge of the operating tube, to position the lower end of the operating rod in the tube and to form an air seal.

Mounted on the reduced diameter end portion of the operating rod and retained in position on the rod by the pipe cap 335 is a heavy duty piston ring 329. When the piston is in an "up" position, the piston ring abuts against the air inlet ring. As may be noted from FIGURE 18 the outer diameter of the piston ring is smaller than the annular liner and is substantially larger than the inner diameter of the top air inlet ring.

An outer annular groove 335a is formed on the upper end of the pipe cap to have an intermediate seal ring 330 and the seal ring retainer member 331 mounted therein, said seal ring 330 being of sufficient size to bear against the retainer member 331, the heavy duty piston ring, the cylinder liner and the operating tube.

*Tail Clamp Mechanism.*—Tail clamp mechanism is pivotally mounted on the buck assembly 16 to extend through openings formed in the curved plate and the inner plate, there being a rectangular frame 360 welded to the aforementioned plates to prevent steam from escaping the openings (see FIGURES 17 and 19B). The tail clamp includes a tail clamp lever 359 pivotally mounted on the pivot pin 358 that is secured in the frame 360. The lever 359 includes an inner arm 359b that extends through the frame 360 and has a bifurcated end portion that extends on either side of the operating tube 334 and an outer arm 359a extending generally outwardly from the frame at right angles to the inner arm.

A clamp rod 357 is secured and mounted on the outer arm and in turn mounts an elongated tail clamp retainer member 356 having a longitudinal axis that extends transversely to the tail clamp rod. The retainer member may be made of spring metal as described in the U.S. Patent 2,834,523.

A stop member 366 having a rounded top surface 366b is fixedly secured to the operating rod to extend radially therefrom to underlay the bifurcated end portions of the tail clamp lever. A tail clamp spring 363 is mounted on either side of the operating rod to have its upper end seated in the seats formed in the intermediate bearing block and its lower end seated in the seat 359c formed in the bifurcated end portion to constantly urge the tail clamp lever into engagement with the stop member 366. As a result when the operating tube moves toward its lowermost position, the springs 363 urge the bifurcated end portion through positions A, B, C, D, and E (see FIGURE 19b) and thus pivots the tail clamp retainer member through corresponding positions A, B, C, D, and E into tight abutting engagement with the shirt dressed on the buck while moving the stop 366 upwardly pivots the lever arm against the resistance of the spring to move the retaining member outwardly from the buck cover.

*Sleeve Extenders.*—The sleeve extender structure includes a block 370 fixedly mounted on the upper end of the operating rod, said block having a vertical aperture through which the collar clamp rod 383 extends (see FIGURES 17 and 19A). The lower ends of the coil spring 381 and the inner concentric sleeve 382 extends downwardly over the upper end of the operating tube and are seated in seat 370a of the block 370. The upper end of the coil spring and the sleeve are seated in the seat 315a formed in the top bearing block. The coil spring in an expanded position has an axial length greater than the axial length of the aforementioned sleeve.

The block 370 includes a pair of outwardly extending bifurcated end portions, each having the inner end of the outwardly extending link 372 pivotally connected therein by pivot 371. The other end of each link is pivotally connected to the offset 373a formed on the central portion of the sleeve extender lever 373 by the offset pivot 374.

As may be noted in FIGURE 17, the lever 373 extends downwardly to be pivotally secured to the land 379 by a pivot bolt 377, the land having one end thereof secured to the curved plate and extends inwardly through an aperture formed in the inner plate. The upper end of the sleeve extender lever 373 is pivotally connected to a downwardly extending bent end portion 291a of the sleeve extender 291 by a pivot bolt 375 which is extended through an eye formed in the bent end portion. A sleeve extender extends in a horizontal direction transversely across the width of the buck to be slidably secured in the guide block 376, thence outwardly beyond the outer edge of the buck and then reversely bent to have an inwardly turned arm portion 291b. The general movement and construction of the sleeve extender 291 is described in greater detail in U.S. Patent No. 2,834,523, it presently being noted that as the operating rod moves the pivot 374 is moved through positions 1, 2, 3, 4, and 5.

*Wing Structure.*—Since the structure for moving each of the wings is substantially the same except that it is located on opposite sides of the operating rod, for the most part only the structure for moving one of the wings will be described. Secured to the middle of the inner edge portions of each of the generally rectangular wings 290 is a tab 390 having downwardly extending notch 391 (see FIGURES 17 and 19A). An elongated wing support arm 392 is pivotally secured at its upper end to the tab by a pivot 393 and extends downwardly and slightly inwardly toward the operating rod to be pivotally secured to the lower end of the inner plate by a support arm pivot 394. A wire rod 395 is extended through radial apertures in each of the adjacent end portions of each of the support arm pivots to springily bear against bolt 257 (see FIGURE 19B). As may be noted in FIGURE 17 the central portion of the support arm is bent in an outward direction and then in an inward direction to form the bent portion 392a that corresponds in shape to the inwardly bent portion 290a of the adjacent wing.

An offset portion 401a having a rounded edge 401b to slidably bear against the inwardly bent wing portion is formed on the lower end of the operating link 401, said link being pivotally connected to the support arm slightly above the support arm bent portion by a connector pivot 403. A roller 404 is mounted on the connector pivot to roll on the inner vertical edge 290b of the wing as said wing is moved between an expanded and a retracted position. The roller and rounded end help maintain the wing in a vertical position but still permit the wings to tilt to adjust for various shaped shirts.

Mounted on the top pipe cap 340 are a pair of outwardly extending support plates which are connected by pivot 402 to the upper end of the operator link 401.

Each set of pivots 371, 402, 394 is located adjacent to a single vertical line which is drawn parallel to and closely adjacent the operating rod while each set of pivots 374, 377, 403 is located adjacent to a second vertical line parallel to and spaced outwardly from the first line when the wings are in a retracted position. By providing the above described linkage connectors and pivots, a greater mechanical advantage is obtained when the wings are expanded in a large size shirt than in a small size shirt.

*Collar Clamp Mechanism.*—The collar clamp mechanism herein illustrated and described is generally of the type described in U.S. Patent No. 2,834,523 and therefore said mechanism will be only briefly described. The collar clamp mechanism, generally designated 292, includes a frame 410 that is shaped to be mounted in the buck recess 287, said frame including an upright curved collar plate 412 (see FIGURES 1, 5 and 19A). Mounted on the frame is a plurality of mechanical linkages 414 that pivot on the respective pivots 415, 416. The handle 411 is connected to said linkage members to rotate and lock the lever 413 and the spring strut 409 connected thereto in a position to releasably hold the clamping plate 408 for retaining the forward portions of a collar 484a between said plate, the spring brace 418, the backing member 417 and against member 412.

Also connected (the connection not being shown) to the mechanical linkages to extend into aperture 268 of the buck to overhang the rod 383 is a foot 412, said rod being mounted in the upper end of the control rod to extend upwardly through the bearing block 315. The collar clamp is constructed such that when the handle is rotated to lock the collar plate in a clamp position, the rod 383 in being moved to its uppermost position (FIGURE 19A) will move the foot 412 to operate the mechanical linkages to "open" the collar clamp (as shown in FIGURE 19A).

*Safety Door Mechanism.*—The safety door 48 is made up of an outer door panel 424 and an inner door panel 425 which are connected together to be moved in an "extended position" as illustrated in dotted lines in FIGURE 15 and a "folded position" as illustrated in solid lines in the same figure. The inner door panel is hingedly mounted on the side wall by top and bottom hinges 426, one element 426b of each hinge being attached to the side wall 45 by a nut and bolt 426a and the other element 426d secured to said panel (see FIGURES 15 and 16). A pivot member 426c joins the two adjacent hinge elements 426a, 426b.

A pair of channel shaped reinforcing members 420 are secured respectively to the top and the bottom edge of the inner panel. A pair of hinge arms 438 are mounted to extend along each of the members 420, there being a pivot 456 pivotally securing the outer end of a hinge arm to a mounting member 457 which in turn is secured to the adjacent corner portion of the outer panel. The inner ends of the hinge arms are connected to the respective hinge elements 425d.

The mechanism 429 for moving the door between an extended and a folded position includes a pneumatic operated cylinder 432 having an air line 578 connected thereto and a piston mounted in said cylinder, there being a piston rod 435 connected to said piston. A cylinder projection 433 is connected to the cylinder mounting bracket 431 by the pivot 434. The mounting bracket is attached by bolts 430a to the angle bracket 430 which in turn is secured to the vertical brace 30 by conventional means such as welding.

Fixedly secured to the inner surface of the side walls 45 intermediate the spaced hinges 426 is a bell crank pivot bracket 439 having an outwardly extending arm. A pair of nearly right angular horizontal bell cranks 437 are connected at one end to the bracket arm by the bell crank pivot 440. The outer end of the piston rod 435 is connected to the apex portion of the bell cranks by pivot 436.

An angular pivot arm 447 is pivotally mounted to extend through the rectangular slot 442 formed in the central portion of the inner panel 425, there being a flange 441 connected to said panel on either side of said slot and a pivot pin 448 secured in the flanges for pivotally mounting the pivot arm. An elongated opening 451 is formed in the side wall 45 to have portions of the pivot arm and the bell cranks extended therethrough, there being a pivot member 450 connecting one end of said pivot arm to adjacent ends of the bell cranks.

A pair of spaced control links 444 which are mounted on the outer panel are connected at their outer ends to a mounting member 446 by a control link pivot 445. The opposite ends of the control links are connected by pivot 449 to the end of the pivot arm extended through the slot 442.

When air is introduced into the cylinder 432, the piston rod pivots the bell crank 437 about the pivot 440 in the direction of the arrow 453 which in turn causes the pivot arm to rotate in the direction of the arrow 454 and at the same time to move outwardly in the general direction of the arrow 452 through slot 451. The movement of the pivot arm is transmitted through the control link 444 to pivot the outer panel relative to the inner panel (arrow 455) as said inner panel is pivoted about the hinge member and thereby moves the door to the extended position. A strong coil spring 443 is attached at one end to the upper end of the piston rod pivot 436 to retract the piston rod, when air pressure is no longer being applied to the cylinder 434, to move the safety door to the folded position.

The outer panel 424 is bent along a vertical line 424a at a central portion to form the slightly inwardly extending portion 424b and is further bent to form an inturn portion 424c at the outer end of said panel. When the door is extended, the inturned portion extends closely adjacent to and in front of a portion of the buck assembly at the loading station.

*Yoke Press Assembly.*—The yoke press assembly generally designated 18 includes a base mounting member 471 which is secured to the outer rear portion of the support member 27 (see FIGURES 2 and 5). The base plate 481 of the upwardly extending cylinder 472 is secured to the top of the base member by conventional means such as bolts 473. A heavy cylinder cap 474 is attached to the upper end of the cylinder to provide a reinforcing member and slidably mount the piston shaft 475. The cylinder cap is abuttingly engaged by a circular plate 482, which is secured to the piston rod at the lower end of the piston stroke to limit the downward movement of the piston.

The heavy, generally A-shaped, rocker frame 477 is attached at its apex portion by pivot 483 to the pivot bracket 476 which in turn is mounted on the circular plate 482. A depending offset 478 is welded to the central portions of each of the legs of the rocker frame to be connected to the upper end of the channel shaped control arm 479, there being a pivot 486 extended through an offset and the adjacent parallel leg 479a of the control arm. The lower end of the control arm is connected to the cylinder base by a pivot 487.

The yoke presser head 484 having a central notched-out portion to fit around the collar clamp and an under surface 484b curved to match the curvature of the buck yoke member 280 is secured to the outer ends of the A-frame by bolts 485. The length of the piston stroke, the control arm 479, the rocker frame and the location of the pivotal connection of the aforementioned members are chosen such that when the piston rod 475 is in its extended position (solid line in FIGURE 5) the yoke presser head bears against the buck; and when the piston is retracted (neutral position), the rocker frame extends in a generally vertical direction (dotted line—FIGURE 15).

As may be noted none of the yoke press assembly members extend rearwardly of the base member 471 when the yoke presser head is moved from a neutral to a press position. A limit switch 499 is mounted on the mounting base to have a switch arm moved by the control arm when it returns to the neutral position.

The yoke presser head 484 is steam heated, the inner portion of said head being hollowed to form a steam cavity (not shown). A steam inlet port 490, which extends inwardly into the aforementioned steam cavity, is fluidly connected to flexible yoke steam line 491, the opposite end of said steam line being fluidly connected to one end of the yoke steam supply line 492. The steam line 491 in turn is connected to the main steam supply line 495 (said connection not shown). Appropriate brackets 493 are provided for securing the yoke steam supply line to the base member 471. A yoke condensate line 494 is likewise fluidly connected to the yoke steam cavity at one end and to the main condensate return line at the other end.

*Pressing Machine Control Mechainism.*—The control mechanism generally designated 20, includes a machine switch panel 37 and the machine control box 22 (see FIGURES 1, 20, 22A and 22B). The machine switch box has a plurality of manually operated machine control switches mounted therein consisting of a cancel switch 389, a first yoke press switch 386, a second yoke presser switch 386 and an "In" switch 388. The machine control switches may be of the nature described in U.S. patent application, Ser. No. 794,717, now Patent No. 2,999,917. Situated in front of an directly beneath the machine switch panel is a foot pedal switch 385. The aforementioned switches are connected to electrical circuitry in the control box 22 by electric circuitry to be set forth hereinafter.

The machine control box 22 is secured on one side to the bracket 454 that is bolted to the vertical brace 30 by bolts 423. A pair of spaced braces 456 are secured at one end to the upright post 29 and at their opposite ends to the control box.

The control box includes a rectangular housing 457 having a closure member 458 hinged by hinges 459 to one side of the housing. A latch 460 is provided for opening the closure member. A plurality of solenoid operated air valves and electric circuitry that are described hereinafter are mounted in the rectangular housing.

The air circuit and air circuit controls, generally designated 500, include the valves, controls and gauge illustrated on FIGURE 5 and schematically illustrated in the air circuit diagram, FIGURE 21. The air circuit diagram illustrates various components of the machine and the air circuit connections to said components said components including the two buck assemblies and the buck cylinder-shafts, the transfer arm and transfer arm cylinder, the presser heads and the cylinder, the yoke presser assembly and yoke press cylinder, and the safety door and safety door cylinder.

The main air supply line 502 connects conventional means (not shown) for supplying the air under pressure to one leg of a T-joint 506. An exhaust valve 503 having a handle and an outlet 503b is connected to a second leg of the aforementioned T-joint. The coupling 504 connects the third leg of the T-joint to the air inlet port of the water trap 505, the air outlet port of said water trap being connected to the air inlet port of the pressure regulator 507 by a coupling 504. The outlet port of the pressure regulator is connected by a coupling 504 to the inlet of a second T-joint 506 which has a pressure gauge 509 connected to one leg thereof, the outlet end of the T-joint in turn being connected to the oiler 510 by a coupling 504. The air outlet of the oiler in turn is connected to one end of the air inlet line 511 which extends through the aperture 514 to the control box 22. A pair of mounting brackets 513 are provided for retaining the aforementioned exhaust valve, oiler, pressure regulator, pressure gauge and air cleaner in position on the end panel 39.

The other end of the air inlet line 511 is connected to a T-joint 518 which is mounted in the control box 37. The flow of air from the aforementioned T-joint to the various operating cylinders is controlled by the aforementioned plurality of air control valves, said valves being designated 520, 521, 522, 523, 524, 525, 526 and 527 respectively (see FIGURE 21). The air control valves are mounted in the control box although in the diagram 18 said valves are represented as being located at different locations and connected by various lines and junctions. The various locations of the valves and the circuit connections thereto as illustrated are not to be considered a limitation on the invention since it is illustrated in the aforementioned manner to facilitate the description of the air circuitry.

Each of the air control valves 520 to 527 inclusive have an inlet port, an exhaust port, a connecting member including a control port and solenoid means for moving said connecting members to alternately connect said control port to the inlet port and to the exhaust port. The branch air line 529 extends from the leg 518b of the T-joint 518 through the plurality of spaced junctions 542, 541, 540 to the junction 539, said junctions in turn being fluidly connected to the respective air inlet ports 520a, 522a, 521a, and 523a by the respective connector line 538, 536, 535 and 534. A second branch air line 530 extends from the leg 518a of the T-joint 518 to the T-joint 543. A connector line 545 connects one leg of the T-joint to a pivot port in the direction valve 526. Another connector line 546 connects the third leg of the T-joint to the inlet port 527a of the safety door valve.

An air line 548 connects the control port 526b to the junction 549 and thence to junction 559 which in turn is connected to the air inlet port 524a of the first buck control valve 524 by air line 561. The junction 559 is also connected to the inlet port 525a of the second buck control valve 525 by air line 560. Another air line 552 connects the junction 549b to the junction 553, the junction 553 being connected through the line 554 to the inlet port 555 of the transfer arm cylinder 247. The air line 556 connects the junction 553 to the control port 523b of the transfer arm out control valve 523.

Extending from the control port 520b of yoke control valve to connect said valve to the flow control 567 is a yoke connector line 566, said control in turn being connected to the port 569 formed in the lower end of the yoke cylinder 472 by the yoke air line 568. The aforementioned flow control regulates the air pressure applied to the yoke cylinder 472.

Fluidly connecting the control port 521b of the squeeze arm control valve 521 to the port 572 of the squeeze cylinder 116 is an air line 571. Similarly the control port 522b of the transfer arm "in" control air valve 522 is connected to the transfer arm cylinder port 575. Likewise the control port 527b of the safety door control valve 527 is fluidly connected to the port 579 of the safety door cylinder 432.

The valves that directly control the flow of air into the buck cylinder or cylinder shaft 227 of the first buck 15 are the directional control valve 526 and the first buck control valve 524. The top part 583 of the first buck shaft-cylinder is fluidly connected to the first buck control valve control port 524b by air line 582 while the bottom port 585 is fluidly connected to the top directional control valve port 526a by air line 584. The top port 587 of the second buck shaft cylinder 228 is fluidly connected to the second buck control valve control port 525b by the air line 588 while the bottom port 590 is fluidly connected to the top directional control valve port 526c by the air line 589.

The aforementioned operating cylinders, with the exception of the safety door cylinder, exhaust through the exhaust muffler 122. The main exhaust line 595 fluidly connects the exhaust muffler to the junction 598. The first branch line 596 which is fluidly connected to junction 595 extends through the spaced junction 599, 600, 601, and 602, said junctions in turn being fluidly connected to the respective exhaust ports 523c, 521c, 522c, and 520c by the respective connector lines 603, 604, 605, and 606. A second branch line 543 fluidly connects the junction 598 to junction 608 which in turn is fluidly connected by connector line 609 to the second buck control valve exhaust port 525c. Similarly a connector line 610 fluidly connects the junction 608 to the first buck exhaust port 524c.

*Electrical Components 625.*—Referring now to FIGURES 22A and 22B power is supplied to the pressing machine of this invention through a pair of main lines L1, L2. The main line L1 is connected to the terminal 627 of the control panel door switch 628, said switch being operated and closed by the control panel door to provide safety features. A second terminal 629 of switch 628 is connected through line 667 to the terminal 630 of the normally closed return switch 389, said return switch being hand operated to open the electrical connection between the first terminal 630 and the second terminal 633 to return the machine to a neutral position either at the end of a day's operation or in the case of an emergency.

An electric line L3 connected to terminal 633 extends through line portion 634 to junction 635 and thence through and connected to the plurality of spaced junctions 636, 637, 638, 639, 640, 641 and to junction 642. The main line L2 extends through and is connected to the plurality of spaced junctions 646, 645, 644, and to junction 643.

The electric circuitry for controlling the operation of the yoke press mechanism 18 includes a yoke press machine switch 386 having a terminal 651 connected by the line 650 to junction 635 and a second terminal 653 connected by line 654 to the first terminal 655 of the second yoke presser head machine switch 387. The manually operated switch member 652 is normally in an open position, however, upon being manually operated it makes an electrical connection between the aforementioned terminals 651 and 653.

The second yoke machine control switch has a normally open manually operated switch member 656 that makes electrical contact between the terminal 655 and the second switch terminal 657. A line 658 connects the terminal 656 to the junction 659, said junction in turn being connected through line 660 to the normally closed terminal NC of the yoke press timer 903.

An electric circuit extends from main line junction 636 through line 690 to the terminal 691 of the yoke hold in circuit solenoid 901, a second terminal 693 of said solenoid being connected through line 694 to the aforementioned junction 659. A normally opened solenoid operated switch contact member 692 is provided for making an electrical connection between the aforementioned terminal 691 and 693.

An adjustable yoke press timer 903 includes a motor-spring movable contact member 712 to alternately open and close timer contact C and NO, and C and NC, said contact member normally making an electrical connection between contacts C and NC. The electric timer motor is energized at terminals 671 and 672 and when power is applied to said terminals the timer motor immediately starts (the yoke presser head also being moved to a pressing position). The electric timer then continues to operate for a time interval during which the yoke press remains in the pressing operation, the time interval being controlled by an external control knob (not shown). At the end of the selected time interval, the electric timer motor operates the contact member 712 to open the circuit through contacts C and NC and at the same time closes the electric circuit through contacts C and NO. As soon as the timing motor of the electric timer is de-energized, appropriate spring means (not shown) resets the timer preparatory to another cycle. That is, the switch contact member 712 is moved to again make an electrical connection between terminals C and NC and open the connection between C and NO to de-energize the timer motor terminals 671, 672, and solenoid 901.

The circuit for energizing the timer motor includes the electric circuit extending from contact C through line 664 to junction 665 thence over line 670 to the timer terminal 671 then through the timer motor (not shown) to the timer terminal 672. From the terminal 672 a circuit extends via line 673 to junction 674 thence over line 701 to junction 700 and then to the end switch terminal 708 via line 662. The second end switch terminal 707 is connected to the main line junction 646 via line 711. From the foregoing it may be seen that when the operator simultaneously depresses the yoke switch control member 652, 656, provided that the end switch contact member 705 is "closed" to make an electrical connection between terminal 708 and 707, an electric circuit is provided to energize the yoke press timer 903. The yoke timer hold-in circuit is provided so that once the operator has depressed the machine switch control member 652, 656 to energize the timer, the timer will remain energized until the end of the timing interval. The aforementioned hold-in circuit previously described in part includes a solenoid 901 having a solenoid coil 695 connected to be energized through junctions 700 and 665, said solenoid coil moving the switch contact member 692 to a closed position when it is energized. It is noted that the solenoid coil remains energized as long as the switch contact member 712 makes contact between terminals C and NC and the end switch is in a "closed" position.

The solenoid coil 666 of the yoke air control valve 529 is connected across junctions 665 and 674 to be in parallel with the yoke press timer motor. As a result, at the same time as the timer motor is energized the solenoid coil 666 operates a control member to make a fluid connection between the control port 520b and the inlet port 520a and thereby applies air to the bottom of the yoke press cylinder 472. As soon as the yoke press solenoid is de-energized (at the end of the timer cycle) the control port 520b is fluidly connected to the exhaust port 520 c to exhaust the yoke press cylinder.

A circuit extends from the main line junction 640 via line 760 to the first terminal 761 of the yoke limit switch 499. The limit switch includes a switch contact member 762 to selectively open and close electrical connection between the first and the second terminal 763. The switch contact is retained in a closed position; however, when the yoke presser head is out of the neutral position, the movement of the channel 479 permits the contact 762 to be biased to an "opened" position.

An electric circuitry extends from the terminal 763 via line 764 to the first terminal 765 of the transfer arm "in" control valve 522 and thence through the solenoid coil 767 to second terminal 768. When the solenoid is energized, the control port 522b is fluidly connected to the inlet port 522a of the transfer arm cylinder 247 to apply air to move the piston to a retracted position and when the solenoid is de-energized said control port is fluidly connected to exhaust 122 to exhaust the inner end of said cylinder.

The second terminal 768 of the solenoid 767 is electrically connected via line 769 to the head limit switch terminal 770 of the presser head-wing expander limit switch 153. The second terminal 772 is connected via line 773 to the second terminal 789 of the foot switch 385. The third foot switch terminal 791 is connected through line 792 to junction 778 and thence through line 793 to main line junction 643.

The first foot switch terminal 788 is connected to the transfer arm "out" solenoid terminal 786 over line 787, thence through the solenoid coil 785 to the other solenoid terminal 782 and then by line 781 to the first main line junction 641. When the solenoid coil 785 of the transfer arm "out" air control valve 623 is de-energized a fluid connection exists between the control port 523b and the exhaust port 522c to exhaust the transfer arm cylinder through a port 555, and when energized breaks the aforementioned fluid connection to make a fluid connection between said control port and the inlet port 523a to apply air to port 555 to move the piston rod to an extended position.

The aforementioned foot switch 385 is of a type having a switch contact 790 that normally makes an electrical connection between the terminals 788 and 789. However, when sufficient pressure is applied to the foot switch by the operator stepping thereon, the switch contact is moved to break the electrical connection between the terminals 788 and 789 and to form an electrical connection between the terminals 788 and 791. Upon releasing or lifting up on the aforementioned foot switch, the switch contact 70 again makes an electrical connection between terminals 788 and 789.

The transfer arm control circuit extends from the junction 692 via line 806 to the one terminal 807 of the manual machine control "in" switch 388. The "in" switch includes a normal "open" switch contact 767 which upon being depressed makes an electrical connection between the terminal 807 and a second terminal 809, which is electrically connected via lines 810 to junction 805 and thence through line 817 to the second terminal 816 of the transfer arm control solenoid 906. The first terminal 812 of the transfer arm solenoid is connected by line 811 to the main line junction 642, while the third terminal 820 is connected to the first foot switch terminal 788 through line 821 to junction 800 and thence via the line 794. The fourth contact 818 is electrically connected through line 819 to junction 780a thence over 784 to junction 780b and finally over line 722 to the second terminal 685 of the presser head control solenoid 905. The transfer arm control solenoid coil 825 is connected across junctions 800 and 801, junction 801 being connected over line 796 to junction 805.

When the transfer arm control solenoid 825 is de-energized the first transfer arm switch contact 815a remains in a normally open position; however, when the solenoid 825 is energized, the contact 815a closes the circuit between the first and second terminals 812, 816. Similarly, the second transfer arm switch contact 815b is normally open but when the aforementioned solenoid is energized, the contact electrically connects terminals 820, 818. The two switch contacts 815a, 815b act as hold-in circuits.

Connected parallel with the transfer arm control solenoid 825 is the safety door solenoid coil 795, said coil being connected across junctions 800, 801. When the solenoid 795 is de-energized the control port 527b is connected to the exhaust port 527a but when energized it is connected to the inlet port 527c to supply air under pressure to the safety door cylinder 432 to move the safety door to an extended position.

The electric circuitry for controlling the air flow into the buck cylinders includes a line 735 which extends from the junction 639 to junction 736 and thence through line 738 to the first terminal 740 of the direction switch 461. The second terminal 741 of the direction switch is connected via line 737 to terminal 734a of the first buck air control solenoid 734 and through said solenoid to terminal 733. The aforementioned terminal 733 is connected via line 732 to the junction 747 and thence via line 720 to the first terminal 726 of the presser head control solenoid 905. A line 722 connects the second terminal 685 of the presser head solenoid to the junction 780b which as previously set forth is connected to junction 780a. Junction 780a is connected via line 779 to the first terminal 775 of the wing expander section of the head-wing expander limit switch 153, said switch including a switch contact 771 for opening and closing the circuit between the first terminal 775 and the second terminal 774. The second switch terminal is connected through the line 776 to junction 778 which is connected via line 793 to junction 643.

The circuitry for controlling air flow into the buck cylinders also extends from junction 736 through the line 739 to the third direction switch terminal 742. The fourth direction switch terminal 743 is connected through the line 751 to the junction 750 and thence through the first buck solenoid coil 748 of the second buck control valve 525 to junction 747. Junction 750 is also connected through solenoid 755 of direction control valve 526 to the main line junction 643.

When the solenoid coils 734, 748 are de-energized their respective control ports are fluidly connected to their respective exhaust ports and when energized, to their respective inlet ports. When the solenoid coil 755 is energized, the control port is fluidly connected to the bottom port 590 of the second buck cylinder and when energized, to the bottom port 585 of the first buck cylinder.

The presser head control circuitry includes a line 718 extending from main line junction 638 to the common terminal C of the presser timer 904. The presser timer is the same general construction as the yoke timer and includes terminal NC which is connected via line 717 to the fifth terminal 728 of the presser control solenoid 905. The aforementioned solenoid includes a sixth terminal 683 which is connected via line 682 to the junction 676 and thence through the solenoid coil 681 of the presser control solenoid to the main line junction 645. Junction 676 is also connected through line 710 to the junction 707 and thence through line 709 to the first terminal 713 of the presser timer motor (not shown). The second terminal 714 of the presser timer motor is connected through line 715 to the junction 780c and then through line 725 to junction 780b. Junction 780c is also connected via line 738 to the third terminal 727. The fourth terminal 684 is connected by a line 686 to the main line junction 644.

The presser head control solenoid has a normally open first switch contact 729, a normally closed second switch contact 730, and a normally open third switch contact 731. When the solenoid coil 681 is energized the aforementioned switch contacts 729, 731 are moved from their normally open position to a closed position and switch contact 730 from the normally closed position to an open position, the first contact opening and closing an electric circuit between the first and second terminals 726, 685, the second contact opening and closing a circuit between the third and fourth terminals 727, 684, and the third contact opening and closing the circuit between the fifth and sixth terminals 728, 683.

The presser timer motor of the timer 904 is connected to move contact 716, said contact normally connecting terminal C to terminal NC. After the timer motor is energized, the period of time for which it is set starts to run. At the end of the period of time for which the timer is set, the contact 716 is moved to open the electrical connection between terminal C and terminal NO. As a result the timer motor is de-energized and contact 716 is again returned to its previous position to be ready for another cycle of operation.

A counter is connected across terminals NC and 780C, said counter being energized to count an additional pressed article after the contact 854 moves from terminal NC to terminal NO.

In addition to the circuitry previously described, junction 637 is connected via line 702 to the first terminal 703 of the location switch, the second terminal 704 of said switch being connected through line 706 to junction 707. From junction 707 a line also extends through the solenoid coil 680 of the squeeze arm control valve 521 to junction 674. When coil 680 is energized, inlet port 521 is fluidly connected to squeeze arm cylinder port 572 and when de-energized connects port 572 to the exhaust port 521c of the control valve 521.

*Operation.*—For purposes of facilitating the description of the operation of the pressing machine, it will be assumed that the machine is to be started up after having been turned off at the end of the preceding day's operation.

After turning "on" the main electric control switch (not shown) a circuit is completed to the main line L1, through the door switch 628 (providing the panel door is in a closed position) and thence through the return switch 389, the return switch contact 631 normally being in a position to form a closed circuit between terminals 630 and terminal 633. Electricity is now provided to be connected to the appropriate terminals and to energize timers, solenoids, and the counter once the appropriate switches in the pressing machine have been moved to the proper positions.

To apply air to the air circuitry in the pressing machine, the main control valve (not shown) in the main air supply line 502 is turned on. Air is then supplied through the main line 511 to the branch lines 529, 530 and to the inlet ports 520a, 521a, 522a and 523a, and 527a of the yoke control valve, the squeeze arm control valve, the "in" and "out" transfer arm control valves, and the safety door control valve respectively. Since the "in" transfer arm control valve solenoid 785 is not energized, a fluid connection exists between the inlet ports 523a and the control ports 523b to apply air through the line 554 to the port 555 of the transfer arm cylinder. At the same time air flows through lines 556, 552 to the control port 526b of the direction control valve 526. Whether air is applied from port 526b to the first or second buck control valve or neither valve will depend on the position of the direction switch contact, the position of said contact being dependent on the pivotal position of the transfer arm assembly.

As a result of establishing an air communication from the main supply line to inlet port 555 the transfer arm piston rod is moved to a fully extended neutral position, provided that it is already not in said neutral position. Thus, if the pivotal axis of the connector pivot is located below the longitudinal axis LL as illustrated in FIGURE 11, the piston rod will pivot the transfer arm buck support assembly in the direction of the arrow 950 until the piston reaches the end of its stroke. At this time the first buck 15 will be located at the endmost position at the loading station.

In the event that the transfer arm buck support mechanism should be positioned such that the connector pivot is located above the longitudinal line LL as shown in FIGURE 15, as soon as the air is applied to the transfer arm cylinder, buck 16 will be moved to the endmost position at the loading station. As a result of the aforementioned air and power circuitry, means are provided for moving the buck assemblies to an endmost position as soon as the air is applied to the transfer arm cylinder, without the transfer arm going past the center position this being a safety feature incorporated in the pressing machine. Thus in the event a person should have his arm intermediate the buck at the loading station and presser station when air and power are applied to the machine, the person's arm will not be caught between the sidewall 45 and the aforementioned buck since the aforementioned buck will always move to the loading station when air and power are first applied to the machine.

Assuming now that the transfer arm cylinder has moved the transfer arm buck support mechanism to an end position wherein buck 15 is at the loading station, the direction switch cam 460 actuates the switch contact 744 to make an electrical connection between the first and second terminals 740, 741 of the direction switch assembly and as a result, solenoid 755 is de-energized. With the solenoid 755 de-energized, a fluid flow connection exists between the control port 526b and the inlet port 526a to establish a fluid flow channel from the inlet T 518 to the bottom of the first buck cylinder 227. Applying air to the bottom of the aforementioned cylinder moves the connector rod and connector tube in an upward direction, the tail clamp outwardly from the buck, and retracts the wings and sleeve extenders.

Now the operator dresses a shirt on the buck 15. The manner of dressing the shirt on the buck is more completely described in U.S. Patent No. 2,834,523 and thus will not be described in detail in the present application.

After the shirt has been positioned on the buck the operator moves the collar clamp handle 411 in the direction of the arrow 954 (FIGURE 5) to move the clamping plate 408 into engagement with the collar, adjacent the collar button and the collar buttonhole. Then, after having smoothed out the yoke area of the shirt, the operator has to use both hands for depressing the spaced yoke switch plates of the machine control switches 386, 387 to move the respective switch contacts 652, 656 to establish an electric circuit between junctions 635 and 659 through said contact.

Upon depressing the aforementioned switch plates the yoke control solenoid 666, the yoke timer 903 and the yoke holdin solenoid 901 are energized (provided buck 15 is in its endmost position). If buck 15 is not in its endmost position than the center-end switch contact 704 will be in an open position and as a result even though the yoke switch plates are depressed, the aforementioned timer, yoke hold-in solenoid and yoke controls solenoid will not be energized. Thus the end switch assembly provides a safety feature in that it prevents the yoke presser head from being lowered and damaging a buck when a buck is away from its endmost position. Also by using a pair of yoke machine control switches another safety feature is provided in that the operator has to use both hands in order to actuate the yoke presser head.

As soon as the yoke switch plates are depressed, the yoke solenoid 901 is energized and the switch contact completes the yoke press hold-in circuit and thereby allows the operator to perform other tasks while the yoke portion of the shirt is being pressed. At the same time as the yoke hold-in solenoid is energized the yoke control solenoid 666 is energized to fluidly connect the inlet port 520a and the control port 520b and thus establish a fluid channel between the air inlet T 518 and the bottom of the yoke cylinder 472 to move the yoke presser head to bear against the yoke portion of the shirt and press said portion of the shirt. The length of time in which the yoke presser head presses the yoke portion of the shirt is controlled by the electric timer 902. A the end of the yoke pressing cycle, yoke timer contact 712 automatically moves 689 to open the circuit between the terminals NC and C and thus opens the yoke hold-in circuit and thence again back to complete an electrical connection between the terminals NC and C, the yoke press circuit not being re-energized until the yoke switch plates are again depressed. At the same time as the holding circuit is de-energized, the yoke control solenoid is de-energized to again establish fluid flow communication between the control port 520b and the exhaust port 520c so that the yoke cylinder exhausts through the exhaust 122.

After the yoke switch plates have been depressed to actuate the yoke press circuitry, the operator smooths the front of the shirt and grasps the lower end portions of each of the front panels to pull them in a downward direction and move them towards one another to position said end portions between the respective adjacent end portions of the tail clamp and the buck. Now, the foot switch is depressed to move the switch contact 789 to make an electrical connection between the terminals 788, 791 to energize the "out" transfer arm control solenoid 785 which in turn establishes a fluid flow connection between the control port 523b and the exhaust port 523c to form an unobstructed fluid flow channel from the bottom of the first buck shaft-cylinder 227 to the exhaust muffler 122 to exhaust said cylinder 227 and to exhaust the inner end of the transfer arm cylinder 247.

As the buck shaft cylinder is exhausted, the control rod 334 and control tube 269 move in a downward direction (arrow 957) to lower the stop 366, the coil spring 381 acting against the bearing block 315 in conjunction with gravity to move the control rod in a downward direction so that the lower end of the control rod sets in recess 264a. As the stop is moved to a lower position through a series of positions A–E, the coil springs 363 pivot the tail clamp about the pivot 358 to move the clamp plate 356 through a corresponding series of positions to tightly retain the shirt in position between said clamps and the buck cover, the coil springs 363 being sufficiently strong to hold the tail clamp in a tightly clamped position. As may be observed in FIGURE 19B a small movement of the control tube moves the tail clamp from the outermost unclamped position A to the clamping position E and thence it continues to move in a downward direction. As the tail clamp is pivoted to a clamp position E, the bifurcated portion 359b is moved away from the control tube so that it does not bear thereagainst.

As piston plate 320 drops into engagement with the bottom of the shaft-cylinder the sleeve extender lever moves the sleeve extender 291 to an extended position and the wings 290 are also moved outwardly from the control rod toward an extended position. The movement of the extenders 291 is indicated by the movement of the pivot 374 through positions 1–5 inclusive which correspond to positions 1–5 of the pivots 393, 403 as will be described. The distance the wings move outwardly from the control rod will in part depend on the size of the shirt, said wings moving in an outward direction until they encounter sufficient resistance from the shirt to stop further movement of the control tube. For example, if a small shirt is being pressed, a support arm will be pivoted in the direction of the arrow 958 a sufficient amount to locate the pivot 403 at the position 2 as indicated in FIGURE 17; however, if the shirt is of a larger size, then a support arm will be pivoted a fixed distance so that the pivot 403 will be located at position intermediate position 2–5.

As may be observed in FIGURE 17 a larger mechanical advantage is obtained the further pivot 403 is moved in an outward direction. If a larger shirt is dressed on the buck, the wings may move a further distance in an outward direction from the control rod thus effectively exerting a greater pressure through the wings against said shirt than if a small shirt was dressed on the buck. Of course, it is to be understood that the location 1–5 inclusive of pivots 403, 393 are also indicative of the horizontal distance between the outer vertical edge of the wing and the control rod.

In the event that the operator desires to reposition the shirt on the buck the foot pedal is released to de-energize solenoid 785, and thus air is again supplied to the bottom of the cylinder of the first buck to move the control rod and tube to release the tail clamp, retract the wings and sleeve extenders, and move the collar clamp rod in an upward direction to release the collar clamp. Now the operator can again go through the aforementioned procedure to properly dress the shirt on the buck.

After the shirt has been properly dressed on the buck and clamped thereon as previously described, then the "in" switch plate is depressed to move the switch contact 808 to make electrical connection therethrough from junction 642 to the press control solenoid 906. With both the "foot switch" and the "in" switch depressed, an electric circuit extends from junction 642, through switch contact 808, the transfer control solenoid coil 825, the foot switch contact 790 and thence through line 793 to junction 643. Energizing solenoid coil 825 causes switch contact 815a to be moved to a closed position to complete a hold-in circuit that solenoid 825 will remain energized even though the "in" plate is released and moves switch contact 815b to a "closed" position to complete circuitry through the normal closed transfer control switch contact 730 to the main line junction 644 so that said solenoid coil 825 will remain energized even though the foot switch is "released."

The safety door control solenoid 908 being in parallel with solenoid coil 825 is energized to form a fluid channel from the inlet T 518 to the inlet port 579 of the safety door cylinder to move the safety door to an extended position.

After the transfer control solenoid has been energized (provided the yoke presser head is in a neutral position to close the switch contact 762 and the head limit-wing expander switch contact 771 to connect terminals 770, 772), the transfer arm "out" control solenoid 767 is energized. Upon energizing solenoid 767, an air circuit is complete from air inlet line T 518 through the inlet port and control port of the air control valve 522 and thence to port 575 of transfer arm cylinder to retract the transfer arm piston and thus rotate the transfer arm buck support assembly in the direction of arrow 951 (FIGURES 11 and 20) from a generally longitudinal extending position to a transverse extending position A4 as indicated in FIGURE 20.

It is to be noted that if the head limit-wing expander switch is not in a presser head neutral position, switch contact 771 does not electrically connect terminals 770, 772 and thus the transfer arm "out" solenoid is not energized. The aforementioned provides a safety feature to prevent damage to the pressing machine since the machine cannot "transfer" until the presser heads have returned to the neutral position. However, as soon as said heads return to a neutral position, the buck will "transfer" even though the foot pedal switch and "in" were depressed and released sometime prior to the completion of the presser head pressing cycle (provided both switches have been previously depressed at the same time).

As soon as the transfer arm cylinder piston rod has been retracted to rotate the transfer arm assembly through a small angular distance in the direction of the arrow 951, the direction control cam and the location control cam will be moved a sufficient amount so that there respective cam followers will contact the curved surfaces 460c and 468b to move end-center switch contact 705 and the direction switch contact 744 to an "off" position.

When the transfer arm piston has nearly reached the end of the retraction stroke (FIGURE 11, arrow 960) the cam 468 will be rotated sufficiently so that the cam follower 465 will be positioned in the notch 468c and thereby move the switch contact 704 to make an electrical connection between the center switch terminals 703 and 704 to energize the press control solenoid 905 and thereby close the normally open switch contacts 729, 731 and open the normally closed switch contact 730. As a result of the second switch contact 730 being "opened" the electric circuit through the transfer control solenoid 906 is de-energized to open the electric circuit through the transfer arm "out" solenoid, the transfer arm "in" solenoid, and the safety door solenoid. De-energization of the last three mentioned solenoids permits appropriate fluid channels to be formed to permit coil spring 443 to retract the safety door cylinder piston rod to move the safety door to a retracted position, to exhaust the outer end of the transfer arm cylinder through port 575, and to connect the inlet T to port 555 of the transfer arm cylinder to move the transfer arm piston in the direction of the arrow 961. Since the transfer arm pivot 243 has crossed the longitudinal center line, the outward movement of the transfer arm piston continues to rotate the transfer arm buck support assembly in the direction of the arrow 951.

It should also be noted that the de-energization of the transfer piston "in" solenoid also completes a fluid circuit between the air inlet T through the direction air control valve to the bottom port 590 of the shaft cylinder of buck 16, which results in the connector rod and the connector rod tube being moved in an upward direction (arrow 963) to unclamp the tail clamp and the collar clamp, and to retract the sleeve extenders and wings of said buck 16.

After the transfer arm assembly has been moved to its endmost position so that the second buck 16 is located at the loading station, the cam follower 465 will bear against the outer cam end 468b and thus result in the end-center switch contact 705 forming an electrical connection between terminals 708 and 707 to energize the squeeze arm control solenoid 680 to complete the air circuit between the air inlet T and port 572 of the squeeze cylinder, the first press switch contact 729 having previously been closed. Providing air to the bottom of the squeeze cylinder results in the piston rod 124 moving in an upward direction to rotate the crank shaft and cam 149 in the direction of the arrow 965 and move the presser heads toward a pressing position through previously described mechanical connections. Rotating the cam in the direction of arrow 965 causes the switch contact to move away from terminals 770, 772 to an open position and thereby insures that the transfer piston "in" solenoid 767 cannot be energized to move the bucks from their endmost position as long as the presser heads are out of the neutral position.

As the squeeze arm piston approaches the upper end of its stroke the crank shaft is then rotated a sufficient amount to move the crank shaft cam to close the head limit-wing expander switch 771 to make electrical connection between the wing expander terminals 775, 774 and thereby provide an electrical circuit to energize the body press timer motor through terminals 671, 672 and at the same time complete an electrical circuit to energize the second buck solenoid 748, the direction switch contact 744 having previously been moved to form an electrical connection between the direction switch terminals 742 and 743. Thus, as the presser heads are within close proximity of the first buck the second buck solenoid operates to form a fluid connection between port 585 and the air inlet T to apply pressure against the connector rod plate to move the connector rod in a downward direction (arrow 957). As a result the wings of the first buck are being expanded at the same time the presser heads are moved to a fully closed position. Thus, the shirt is "pulled over" the smooth presser head surface to give a better finish than if only pressure was exerted by the presser head against the stationary wings.

After the time interval for which the body press timer 904 has been set has elapsed, the timer moves the contact 716 to open the electrical connection between the timer terminals C and NC and to close the electrical connection between the timer terminals NO and C. As soon as the electrical connection between the timer terminals NO and C is completed, the counter is actuated to indicate that another shirt has been pressed and the body press hold-in circuit is opened to de-energize the body press solenoid. By providing the aforementioned circuitry, the operator cannot actuate circuitry to falsely count a shirt until a buck has gone through the full press cycle. De-energizing the body press solenoid returns switch controls 731, 730 and 729 to their "normal" position. The opening of the first body press solenoid switch contact de-energizes the first buck control solenoid 748 and thereby permits the top of the first buck cylinder to be exhausted through port 583.

During the period of time in which the shirt dressed on the first buck is being pressed, the operator may dress a second shirt on the second buck which is located at the loading station. The procedures of dressing the shirt on the second buck and pressing the yoke portion of said shirt are the same as that described with respect to the first buck. In the event that the operator finishes dressing the second buck and depresses both the end switch plate and the foot pedal to transfer the second buck to the pressing station prior to the time of completion of the pressing of the shirt pressed on the first buck, the transfer "out" solenoid 785 is energized to exhaust the outer end of cylinder 247; however, until the presser heads return to a neutral position to actuate the head limit-wing expander contact to contact terminals 770, 769 to permit the transfer "in" solenoid 767 to be energized, said assembly is not rotated in the direction of arrow 950. Prior to the head limit-wing expander contact completing the aforementioned circuit, the operation of the body timer operates to de-energize the squeeze cylinder solenoid 680 which in turn permits the squeeze cylinder to be exhausted. The coil springs 163 connected to the crank arm 129 rotate the crank shaft in a direction opposite arrow 5 to return the presser heads to a neutral position and to "close" terminals 769, 770. As a result of providing the aforementioned operation of solenoids and associated elements, after the operator has depressed both the end switch plate and foot pedal during the same time period, she may leave the vicinity of the machine and the transfer operation will take place at the end of the pressing cycle of the buck at the pressing station.

When the transfer assembly has been rotated in the direction of arrow 950 approximately to position A4, the center switch contact operates to energize the body timer solenoid and its associate circuits as previously described to further rotate the transfer arm assembly to again position buck 15 at the loading station and to actuate the appropriate controls as previously described. At the end of a day when it is desired to close down the machine, instead of sending a dressed buck into the pressing station, the operator merely depresses the "in" switch and foot pedal at the same time and thus the buck at the pressing station is returned as soon as the shirt dressed on said buck has been pressed.

Moving the transfer arm assembly from one end position A to the central position A4 and thence to the opposite end position A7, air is used as a cushion to prevent said assembly from being jarred by sudden stops. That is, the transfer arm assembly does not move until pressurized air is applied to the "in" side of the piston. After air has been applied to the "in" side of the piston the transfer arm assembly moves to the central position and then pressurized air is applied to the "out" side. However, the orifice formed in the port on the "out" side restricts the flow of air out of the "in" side a sufficient amount to form an air cushion as the piston moves to said opposite side of the cylinder. Similarly the orifice in the "in" side of the cylinder serves to sufficiently restrict the flow of air out said "in" side to form an air cushion when the cylinder is moved toward said "in" side. The aforementioned orifices also serve to form a self-compensating feature in that if too much air pressure is applied to one side of the cylinder then a larger quantity of air will have to pass through the aforementioned orifice before said piston can be again retracted to a position adjacent to said orifice. Also, by providing a two-way operation of the piston and transfer arm cylinder before the transfer arm assembly is moved from one end position to the opposite end position, a safety feature is provided in that if an air line should break, the transfer arm assembly cannot move past center until air is applied to the opposite side of the cylinder.

By providing a parabolic-shaped sprocket affixed to the buck cylinder-shaft, and the gears which are positioned in the gear box, sufficient rotational movement of each of the buck assemblies is obtained so that they will pass closely adjacent to one another and still be positioned in the other's respective end position upon transferring said bucks between the loading station and pressing station.

As pressurized air is applied to the transfer cylinder and thereby rotates the transfer arm gear box, the main drive gear contained therein remains stationary and thus causes the two intermediate drive gears to rotate about their pivotal axis. The aforementioned rotation of the intermediate drive gears is transmitted to the buck shaft drive gear and thereby causes the buck shaft drive gear to rotate in a direction opposite to the rotation of the gear box. That is, assuming the gear box is being rotated in the direction of the arrow 951, the intermediate drive gear will be rotated in a clockwise direction (arrow 970) to in turn cause the buck drive shaft arm 271 to be rotated in a counterclockwise direction (971). Rotating the buck control shaft in a counterclockwise direction moves the buck shaft drive gear to rotate the parabolic sprocket in the same direction.

Due to the shape of the parabolic sprocket, the buck is rotated at varying angular rates relative to the angular rates of rotation of the drive sprocket while the drive sprocket is rotated at the same angular rate as the gear box assembly, as shown in FIGURE 20. Thus, referring to FIGURE 20, when buck 15 is at the loading station the central pivotal axis of said buck is located at B1. At the same time a vertical center plane C1 passed through the longitudinal axes L—L of the buck is co-extensive with the plane passed through the longitudinal axis of the pressing machine. In the end position the pivotal axis of the buck drive sprocket is located at A1. As transfer arm cylinder piston moves the transfer arm assembly so that buck 15 is moved from the loading station to the end position B7 at the pressing station, the buck drive sprocket follows a path of travel indicated by the curved line extending from A1 through A2–A6 inclusive and thence to A7 which is its endmost position at the pressing station. The buck drive sprocket of buck 16 is moved through a corresponding set of positions which are located on the opposite side of the longitudinal axis L—L.

The nearly semi-eliptical arc describing the path of movement of the buck cylinder shaft pivotal axis is divided into a series of segments B1—B2, B2—B3, B3—B4, B4—B5, B5—B6, B6—B7. Thus when the gear box assembly is at one end positioned as indicated by axis TA—TA, the buck cylinder shaft will be located at B1, when the gear box assembly is rotated to the center position A4 the buck shaft will be at B4 and when the gear box assembly is rotated to its opposite end position A7 the buck cylinder shaft will be at the position B7. As the buck cylinder shaft is moved to the positions indicated by B1–B7, inclusive, the buck center plane will be moved through a corresponding series of planes indicated by C1–C7, inclusive, C1 being one end position and C7 being the opposite end position.

The aforementioned rotation of the buck drive shaft is due to the shape of the parabolic sprocket. For example, as the gear box assembly is rotated approximately 20° from A1 to A2, the buck 15 is moved from position B1 to position B2 and the center plane of the buck is moved a substantial distance in a transverse direction and also inclined slightly as shown (C1 to C2). Buck 16 is moved through a corresponding path from the pressing station toward the loading station except that its path of travel is on the opposite side of axis L—L. The movement of the buck 15 through the remaining portion of the transfer cycle is also illustrated in FIGURE 20. As a result of the generally elliptical path of travel of the buck and the rotational movement thereof the adjacent sleeve supports on bucks 15 and 16 are pointed outwardly from the longitudinal axis of the machine and thereby permit said adjacent sleeve supports of the bucks to pass one another without interference. When buck 15 is moved from the pressing station to the loading station it is moved in the opposite direction through the aforementioned positions described for its movement to the pressing station. The paths or movement of the various members of the transfer arm-buck support and buck assemblies permit the construction of a relatively narrow pressing machine that operates at a relatively high rate of speed and still is a safe, sturdy machine that requires a minimum of maintenance and is constructed to facilitate making any repairs that might be required.

As many widely apparently different embodiments of this invention may be made without departing from the spirit and scope thereof, it is to be understood that I do not limit myself to the specific embodiments herein.

What I claim is:

1. A machine having a loading station and a pressing station for pressing shirts and similar garments comprising an elongated frame having a longitudinal axis, an elongated transfer arm-buck support assembly pivotally mounted on said frame, a first buck assembly pivotally mounted on one end portion of the transfer arm-buck support assembly, a second buck assembly pivotally mounted on the opposite end portion of said transfer arm-buck support assembly, and means connected to the transfer arm-buck support assembly for pivoting said transfer arm-buck support assembly to alternately transfer one buck assembly between the loading station and the pressing station and the other buck assembly between the pressing station and the loading station, said transfer arm-buck support assembly including an elongated central frame member that is pivotally mounted on the frame, a first support arm having said first buck assembly mounted on one end thereof, said first support arm being pivotally connected to one end portion of the central frame member, a second support arm having the second buck assembly pivotally mounted on one end portion thereof, said second support arm being pivotally mounted on the opposite end portion of the central frame member and means connected to each of the support arms for rotating said support arms in a direction opposite to the direction of motion of the adjacent end portion of the central frame.

2. The machine of claim 1 further characterized in that each of the buck assemblies includes a pivot shaft that pivotally mounts the assembly on the respective support arms, and that means are connected to each of the pivot shafts for rotating each of said buck assemblies through a series of vertical planes of limited angularity relative to the longitudinal axis of the frame during the rotation of the transfer arm-buck support assembly for transferring the buck assemblies between the pressing and loading stations.

3. The machine of claim 2 further characterized in that the means connected to each of the pivoted shafts includes a generally parabolic-shaped sprocket fixedly mounted on each of said shafts.

4. The machine of claim 1 further characterized in that each of the buck assemblies includes a shaft that pivotally mounts each of the buck assemblies on their respective support arms and that means are connected to each of said shafts for moving each of the shafts through a generally semi-eliptical path as the transfer arm-buck support assembly is rotated to transfer said buck assemblies between the loading station and the pressing station.

5. A machine having a loading station and a pressing station for pressing shirts and similar garments comprising an elongated frame having a longitudinal axis, an elongated transfer arm-buck support assembly pivotally mounted on said frame, a first buck assembly pivotally mounted on one end portion of the transfer arm-buck support assembly, a second buck assembly pivotally mounted on the opposite end portion of said transfer arm-buck support assembly, and means connected to the transfer arm-buck support assembly for pivoting said transfer arm-buck support assembly to alternately transfer one buck assembly between the loading station and the pressing station and the other buck assembly between the pressing station and the loading station, the last mentioned means including a piston-cylinder combination having a piston rod pivotally connected to said transfer arm-buck support assembly and a cylinder, and means for pivotally connecting said cylinder to the frame.

6. The machine of claim 5 further characterized in that the means for connecting said cylinder to the frame includes means permitting the cylinder being adjustably aligned in relation to the frame.

7. A shirt pressing machine comprising a frame, a buck mounted on said frame, said buck being shaped to have a shirt or like garment dressed thereon, a yoke press assembly mounted in position for pressing the yoke portion of a shirt dressed on said buck, said yoke press assembly including a base member, an upwardly extending shaft on said base member, a yoke presser head, a yoke presser head support arm pivotally connected at one end to said yoke presser head and at its opposite end to said upwardly extending shaft, a linkage member having one end pivotally connected to said yoke presser head support arm adjacent to said presser head and an opposite end pivotally connected to said base member, and means mounted on the base member for moving the upwardly extending shaft relative to the linkage member to selectively move the presser head out of and into engagement with the yoke portion of a shirt dressed on the said buck.

8. The machine of claim 7 further characterized in that the means for moving the upwardly extending shaft includes a hydraulic cylinder and that control means are provided for controlling the duration of the time the yoke presser head remains in engagement with the yoke portion of a shirt.

9. In a shirt pressing machine having a loading station and a pressing station, a frame, a first buck assembly, a second buck assembly, transfer means having opposite end portions mounted on the frame for transferring the aforementioned buck assemblies between the loading station and a pressing position at the pressing station, said transfer means having the first buck assembly mounted on one end portion thereof and the second buck assembly mounted on the opposite end portion thereof, a pair of presser head means mounted on the frame at the pressing station for pressing a shirt dressed on a buck assembly located at the pressing station and means for alternately moving both presser head means between a neutral non-pressing position and a pressing position to press the shirt dressed on a buck located at the pressing station, said last mentioned means including only one piston-cylinder combination for moving both presser head means to a pressing position.

10. The machine of claim 9 further characterized in that a yoke press assembly is located at the loading station, said yoke assembly having a neutral position and a pressing position, and control means to maintain each buck assembly at the respective stations while the yoke press assembly is in a press position and upon return of said yoke press assembly to a neutral position actuate the transverse means to transfer the bucks between the loading and pressing station.

11. In a shirt pressing machine having a loading station and a pressing station, a frame, a first buck assembly, a second buck assembly, means mounted on the frame for alternately transferring one buck assembly between the loading station and the pressing station and the other buck assembly between the pressing station and the loading station, said transfer means having the buck assemblies mounted thereon, two presser heads at the pressing station for pressing a shirt dressed on a buck assembly located at the pressing station, and means connected to the presser heads and mounted on the frame for alternately moving both presser heads between a neutral non-pressing position and a pressing position to press a shirt, said last mentioned means including a pair of elongated squeeze arms, each of said squeeze arms being pivotally connected at one end to one of the presser heads and at the opposite end to the frame, said opposite ends being pivotally connected to the frame adjacent one another, means for urging the presser heads to a non-pressing position, and power means for overcoming the action of the means for urging the presser heads to a non-pressing position to move said presser heads to a pressing position.

12. The machine of claim 11 further characterized in that the means for urging each of the presser heads to a pressing position includes a cam pivotally mounted on the frame to exert a force against the end of the squeeze arm connected to the presser head, said power means being connected to said cam, said cam shaped to provide a nearly constant rate of acceleration and deceleration of the presser head adjacent the neutral position and the press position.

13. In shirt buck assembly having a vertical axis, a buck frame that is generally elongated and rectangular shaped in vertical elevation, a frame mounting member connected to the lower end of said frame, a pair of wings mounted on said frame for movement in an opposite direction between an extended position and a retracted position relative to said vertical axis, control means on the frame connected to said wings to alternately extend and retract said wings, said frame mounting member including a cylinder attached to said frame for supporting said frame and a piston, said control means being connected to said piston to be operated thereby.

14. In apparatus for pressing a garment on a buck having oppositely faced pressing surfaces, a frame, a pair of presser heads, each presser head shaped to conform to at least a substantial portion of one of the buck pressing surfaces, a pair of squeeze arms, each of said squeeze arms pivotally connected at one end to a presser head and at the opposite end to the frame to mount each presser head for movement between a pressing position and a neutral position, means on the frame for simultaneously urging the presser head end of each of the squeeze arms through intervals of movement of nearly constant rate of acceleration and deceleration to move the presser heads between a pressing position and a neutral position, the aforementioned means including a cam movably mounted on the frame adjacent each pivotal connection of a squeeze arm to a presser head for moving the respective presser head from the neutral position to the pressing position and means mounted on the frame and connected to the cams for moving the cams to cause the presser heads being moved between said positions.

15. In apparatus for pressing a garment on a buck having oppositely faced pressing surfaces, a frame, a pair of presser heads, each presser head shaped to conform to at least a substantial portion of one of the buck pressing surfaces, said frame having a horizontally extending support member, a pair of elongated squeeze arms for movably supporting the presser heads, each arm pivotally connected at one end to a presser head, means mounted on said support member for pivotally mounting the opposite ends of said squeeze arms in horizontal spaced relationship, the last mentioned means including adjustment means for selectively varying the elevation of said opposite end of each squeeze arm to vary the alignment of a presser head relative the buck, and means on the frame in engagement with each squeeze arm for moving the presser heads between a neutral spread apart position and a buck pressing position.

16. The apparatus of claim 14 further characterized in that the means mounted on the support member includes an alignment bar, means connected to the alignment bar for adjustably positioning said bar relative to the support member and pivot means mounted on said bar forming the pivotal connection for the squeeze arms thereto.

17. Apparatus for pressing a garment on a buck having oppositely faced pressing surfaces comprising a frame, a pair of presser heads, each presser head shaped to conform to at least a substantial portion of one of the buck pressing surfaces, means mounted on the frame for supporting each presser head for movement between a neutral spaced apart position and a pressing position, a shaft rotatably mounted on said frame, means connected to said shaft for being operated by the rotation of said shaft to move both presser heads from a neutral position to a pressing position and operating means on the frame and connected to the shaft for selectively rotating said shaft when the presser heads are to be moved between a neutral position and a pressing position.

18. Apparatus for pressing a garment on a buck having a pressing surface comprising a frame, a pair of presser heads, said presser heads being shaped to conform to approximately one half of the buck pressing surface, means mounted on the frame for supporting each presser head for movement between a neutral spread apart position and a pressing position a shaft rotatably mounted on said frame, operating means on the frame connected to the shaft for rotating said shaft, actuator means connected to the shaft to be operated by the rotation of the shaft for moving both presser heads to a pressing position, means for constantly urging said presser heads to a neutral position, the last mentioned means including a resilient member connected to the frame and to each of the means for supporting said presser heads and a resilient member connected to the frame and said shaft, the connections of said resilient members to the frame and to the shaft and support means and the resilient characteristics of said resilient members being selected to have the resilient members connected to support means to have a greater urging force at a pressing position and the resilient means connected to the shaft to have a greater urging force at the neutral position.

19. In a pressing machine having a loading station and a pressing station, a first buck assembly shaped to have a garment dressed thereon, a second buck assembly shaped to have another garment dressed thereon, and means mounted on the frame for alternately transferring one buck assembly between the loading station, a position intermediate said stations and the pressing station, and the other buck assembly between the pressing station, a position intermediate said stations and the loading station, said transfer means including an elongated transfer frame member having a central depending portion pivotally mounted on the frame, means for pivotally connecting each buck assembly to an opposed elongated end of said frame member so that the buck assemblies are moved between said positions as the frame member is pivoted, means connected to the frame member for pivoting said frame member to move said pivotally connecting means to alternately transfer one buck assembly between the loading station and the pressing station and the other buck assembly between the pressing station and the loading station, the last mentioned means including a piston-cylinder combination having a piston rod pivotally connected to said frame member, a two way acting cylinder and means for pivotally connecting said cylinder to said frame, said piston cylinder combination pivotal connections being located to pivot the frame member and thereby one buck assembly between the loading station and an intermediate portion as the piston is moved through a complete stroke in one direction and move said frame member and thereby the last mentioned buck assembly from the last mentioned intermediate position to the pressing station as the piston moves through a return stroke in the opposite direction, and means on the frame fluidly connected to the cylinder for selectively applying pressurized fluid to opposite ends of said cylinder, the last mentioned means including control means adjacent the frame member and operated by the pivotal movement of said frame member for first applying pressurized fluid to one end of the cylinder and then the opposite end of the cylinder to cause the piston to move in the manner set forth above.

20. The apparatus of claim 17 further characterized in that the means operated by the rotation of the shaft includes a cam movably mounted on the frame adjacent the connection of each support means to the presser head to bear against said support means, a pair of spaced substantially parallel radial arms secured to the shaft and a linkage member connecting each radial arm to a cam to move the respective cam as the shaft is rotated.

21. A machine having operating mechanism for finishing garments, said machine having a front side adjacent which an operator normally works, said machine comprising a frame, said frame having an operator station at one end and a garment finishing station at the opposite end at which said operating mechanism is located, at least one vertically extending panel mounted on the frame on the front side at the garment finishing station to form a shield in front of the operating mechanism at the garment finishing station, a safety door assembly mounted on the frame, said safety door assembly extending upwardly above the shoulder height of the operator, said assembly including a first panel having vertical edge portions, means hingedly connecting one of said vertical edge portions to the frame, a second panel having a pair of vertical edge portions, means for movably linking the two panels to a position opposite vertical edge portions of the first panel adjacent one vertical edge portion of the second panel, operating means connected to the two panels for alternately moving the two panels to an extended position in front of a substantial portion of the operator station and a folded position where both panels are within close proximity of the garment finishing station.

22. The machine of claim 21 further characterized in the the operating means includes cylinder-piston means mounted on the frame, and linkage means connecting the cylinder-piston means to each of the panels for pivoting said panels in opposite directions as said cylinder-piston means is operated.

23. The machine of claim 21 further characterized in that the operating means includes cylinder-piston means mounted on the frame for moving said panels to the extended position and resilient means connected to the frame for moving said panels to a folded position.

24. A machine for finishing garments, said machine having an operator station and a pressing station, said machine comprising a frame, at least one panel mounted on said frame to form a shield in front of the pressing station, a buck assembly, a transfer assembly having the buck assembly mounted thereon for moving the said buck from the loading station to the pressing station, said transfer assembly mounted on said frame and including means for operating said assembly, vertically extending safety door means mounted on said frame at the pressing station at working height for alternately being extended in front of a substantial portion of the operator station and a retracted position to be substantially adjacent the pressing station, operating means for the safety door means, operator control means for actuating the transfer arm operating means to move said buck assembly from the operator station to the pressing station and at the same time actuate the safety door operating means to move the safety door to an extended position.

25. The machine of claim 24 further characterized in that the safety door means includes a pair of panels and linkage means for pivoting said panels and that said operating means are each hydraulic piston cylinder combinations, the safety door hydraulic means operating at a relatively rapid rate to move the safety door cylinder prior to the transfer means being moved adjacent to the pressing station.

26. The machine of claim 24 further characterized in that control means de-actuates the safety door operating means upon the buck assembly being transferred to the pressing station to permit the safety door to be retracted.

27. A machine for finishing garments having a yoke portion and a body portion comprising a frame having a loading station at one end and a pressing station at the other end, a yoke press assembly mounted on the frame at the loading station, said yoke press assembly including a yoke presser head, hydraulic means, linkage means connected to the hydraulic means and to the presser head, said hydraulic means operating to alternately move the linkage means for moving the yoke presser head between a pressing position and a neutral non-pressing position, body press means mounted on the frame at the pressing station, said body press means including a pair of body presser heads, body presser head support means connected to each body press head at one end and to the frame at the other end, cam means on the frame for moving each of said body presser heads between a neutral apart position and a body press position, and means on the frame for operating said cam means, a transfer arm assembly, means on the frame for moving said transfer arm assembly between two endmost positions, said transfer arm assembly including a center subframe pivotally mounted on the frame, a support arm movably mounted at each end of the subframe, and operating means mounted on the subframe for moving the support arms to an endmost position with the end of one arm at the loading station and the end of the other arm at the pressing station when the transfer arm assembly is positioned at one endmost position and for moving said arms to opposite endmost positions when the transfer assembly has been moved to the other endmost position, a buck assembly mounted on the end portion of each support arm, each of said buck assemblies including a buck frame having a vertical axis, said buck frame having a yoke portion and a body portion, a padding covering said frame, a wing and a sleeve support mounted on the buck frame to be extended and retracted outwardly from opposite sides of the vertical axis, a tail clamp mounted on the buck frame for movement between a clamped and an unclamped position, means on the frame for operating the tail clamp, wings and sleeves supports, said support arm operating means at the endmost positions locating one buck assembly in position for the yoke presser head to bear against the said yoke portion in a yoke press position and the other buck assembly in position for the body presser heads to bear against the body portion of said other buck assembly, safety door means mounted on the frame for alternately being extended in front of at least a substantial portion of a buck assembly at the loading station and retracted to a folded position adjacent the pressing station, means in the frame for operating said safety door means between the extended and the folded positions, and means for controlling the operation of said operating means.

28. The machine of claim 27 further characterized in that the operating means for each of the safety door means, buck assemblies, transfer arm assembly and body press means includes hydraulic means and the control means includes a plurality of solenoid operated air valves, solenoids, a body press timer for controlling the duration of the press cycle of the body press, a yoke press timer for controlling the duration of yoke press cycle, switch means and fluid and electric circuitry means connecting the aforementioned control member for controlling the application and exhaustion of fluid from said hydraulic means.

29. The machine of claim 28 further characterized in that the control means includes a foot switch, transfer arm control means, buck control means, a manually operated transfer control switch and electric circuitry means connecting said foot switch to the transfer arm control means and the buck control means for actuating the buck assembly at the loading station to move the tail clamps to an unclamped position and the sleeve supports and wings to a retracted position, said manual switch actuating the transfer arm operating mechanism, said electric circuitry connections being made to require that the foot switch be operated at the same time as the transfer switch to actuate said transfer arm operating means to transfer said buck assemblies.

30. A garment pressing machine comprising a frame having an operator station at one end and a pressing station at the other end, a first buck assembly, a second buck assembly, each of said buck assemblies having a body portion and a yoke portion, transfer means mounted on the frame for alternately moving the first buck assembly to an endmost position at the operator station and the second buck assembly to an endmost position at the pressing station and to interchange the buck assemblies at the aforementioned endmost positions, the buck assemblies being mounted on the transfer means, body press means mounted on the frame at the pressing station for pressing the body portion of a garment, yoke press means mounted at the operator station for selectively pressing the yoke portion of a garment, means on the frame for moving the transfer means to an alternate position, said buck assembly at the aforementioned endmost positions, means for moving said yoke press means to a yoke press position to bear against the yoke portion of the buck assembly located at the endmost position at the operator station, means for moving the body press means to bear against the body portion of a buck assembly located at the said endmost position at the pressing station, means on the frame for controlling the operation of each of said moving means, the control means including manually operated yoke switch control means for initiating and controlling the operation of said yoke press means, limit switch means for rendering the manual operation of said yoke switch control means ineffective until a buck assembly is positioned at the endmost position at the loading station and circuitry connecting said switch means and control means.

31. A garment pressing machine comprising a frame having an operator station at one end and a pressing station at the other end, a first buck assembly, a second buck assembly, each of said buck assemblies having a body portion and a yoke portion, transfer means mounted on the frame for alternately moving the first buck assembly to an endmost position at the operation station and the second buck assembly to an endmost position at the pressing station and to interchange the buck assemblies at the aforementioned endmost positions, the buck assemblies being mounted on the transfer means, body press means mounted on the frame at the pressing station for pressing the body portion of a garment, yoke press means mounted at the operator station for selectively pressing the yoke portion of a garment, means on the frame for moving the transfer means to an alternate position, said buck assembly at the aforemention endmost positions, means for moving said yoke press means to a yoke press position to bear against the yoke portion of the buck assembly located at the endmost position at the operator station, means for moving the body press means to bear against the body portion of a buck assembly located at the said endmost position at the pressing station, means on the frame for controlling the operation of ends of said moving means, the control means including body press control means for initiating and controlling the operation of body press moving means and limit switch means for rendering the body press control means ineffective until a buck assembly is located at the endmost position at the pressing station, and circuitry connecting said control means.

32. The machine of claim 30 further characterized in that each of the buck assemblies includes a buck frame having a vertical axis, wings mounted on said buck frames to be alternately extended outwardly from the vertical axis in opposite directions beyond the buck frame and retracted toward the vertical axis, means on the frame connected to and wings for alternately moving said wings between an extended position and a retracted position, said control means including means for controlling the operation of said wing moving means, said body press control means including circuit means for actuating wing moving means of the buck assembly at the pressing station to extend the wings as the body press means move to a body press position.

33. The machine of claim 30 further characterized in that each of the buck assemblies includes a buck frame having a vertical axis, wings mounted on said buck frames to be alternately extended outwardly from the vertical axis in opposite directions beyond the buck frame and retracted toward the vertical axis, means on the frame connected to said wings for alternately moving said wings between an extended position and a retracted position, said control means including means for controlling the operation of said wing moving means, said control means including direction means normally actuated by the transfer means at each endmost position for actuating the wing control means of the buck assembly at the operator station to extended position.

34. The machine of claim 33 further characterized in that operator actuated means are connected to the direction means for selectively actuating the wing control means of the buck assembly at the loading station to a retracted position and the tail clamp means of the buck assembly at the loading station to a clamped position.

35. A garment pressing machine comprising a frame having an operator station at one end and a pressing station at the other end, a first buck assembly, a second buck assembly, transfer means mounted on the frame for alternately moving the first buck assembly to an endmost position at the operator station and the second buck assembly to an endmost position at the pressing station and to interchange the buck assemblies at the aforementioned positions, said buck assemblies being mounted on the transfer means in spaced relation, body press means mounted on the frame at the pressing station for pressing the body portion of a garment, means on the frame for moving the transfer means to alternately position said buck assemblies at the aforementioned endmost positions, the transfer arm moving means moving said buck assemblies through an intermediate transfer position as the transfer means moves said buck assemblies to exchange endmost positions, means for moving the body press means to a body press position, means for controlling the operation of each of said moving means, circuit means connected to said moving means and control means for applying power to said control means and moving means, said control means and moving means having a datum position after power has been applied for operating said control means and moving means, said circuit means connected to the transfer control means for actuating to the transfer means moving means to move said buck assemblies directly to the closest endmost position in the event said assemblies are located between said intermediate position and the endmost positions as power is applied to set said control means and moving means in a datum position.

36. A garment pressing machine comprising a frame having an operator station at one end and a pressing station at the other end, a first buck assembly, a second buck assembly, transfer means mounted on the frame for alternately moving the first buck assembly to an endmost position at the operator station and the second buck assembly to an endmost position at the pressing station and to interchange the buck assemblies at the aforementioned positions, said buck assemblies being mounted on the transfer means in spaced relation, body press means mounted on the frame at the pressing station for pressing the body portion of a garment, means on the frame for moving the transfer means to alternately position said buck assemblies at the aforementioned endmost positions, the transfer arm moving means moving said buck assemblies through an intermediate transfer position as the transfer means moves said buck assemblies to exchange endmost positions, means for moving the body press means to a body press position, means for controlling the operation of each of said moving means, circuit means connected to said moving means and control means for applying power to said control means and moving means, said control means and moving means having a datum position after power has been applied for operating said control means and moving means, said control means including switch means connected in said circuit means for normally maintaining the body press control means in a de-energized condition in a datum condition and means on the frame operated by the transfer means moving through said intermediate position to move said switch means to actuate said switch means.

37. The machine of claim 36 further characterized in that the body press control means includes a body press timer and hold-in means energized by the operation of said switch means for continuously applying power to said body moving means, said timer at the end of a timed interval connected to said hold-in means to de-energize said hold-in means.

38. The machine of claim 37 further characterized in that a counter in connected to the timer for connecting a garment pressed at the end of a time cycle.

39. The machine of claim 36 further characterized in that the transfer control means includes valve means having normally off position and an on position for applying power to the transfer moving means to move said transfer means from an endmost position and operator actuated means for moving said valve to an on position when said control means and moving means are in a datum position, said body press means including limit switch means connected to the operator actuator means for maintaining the valve means in an off position, with the body press out of a datum position, said limit switch mounted on the frame to be actuated by the presses in a datum position to move said valve to an on position after the operator control means has been actuated by the operator.

40. A garment pressing machine comprising a frame having an operator station at one end and a pressing station at the other end, a first buck assembly, a second buck assembly, transfer means mounted on the frame for alternately moving the first buck assembly to an endmost position at the operator station and the second buck assembly to an endmost position at the pressing station and to interchange the buck assemblies at the aforementioned positions, said buck assemblies being mounted on the the transfer means in spaced relation, body press means mounted on the frame at the pressing station for pressing the body portion of a garment, means on the frame for moving the transfer means to alternately position said buck assemblies at the aforementioned endmost positions, the transfer arm moving means moving said buck assemblies through an intermediate transfer position as the transfer means move said buck assemblies to exchange endmost positions, said transfer moving means including a two-way acting hydraulic cylinder piston combination, said combination connected to the frame and to the transfer means to move the transfer means between one endmost position and the intermediate position as the piston is moved through a complete stroke in one direction and then to move said transfer means from the intermediate position to the other endmost position as the piston moves through a return stroke in the opposite direction.

41. The machine of claim 40 further characterized in that the cylinder has an orifice at the rod end for controlling the outflow of fluid from said cylinder to cushion the movement of said transfer means.

42. In a shirt buck assembly having a vertical axis, a buck frame that is generally elongated and rectangularly shaped in vertical elevation, a frame mounting member connected to the lower end of said frame, a pair of wings mounted on said frame for movement in an opposite direction between an extended position and a retracted position relative to said vertical axis, control means on the frame connected to said wings to alternately expand and retract said wings, said frame mounting member including a cylinder and piston, said control means being connected to said cylinder and piston to be operated thereby and including an upright control rod having a lower end, and a control tube having a lower end, said control tube mounted on said control rod for limited slidable movement relative thereto, said piston including a piston plate secured to the lower end of the control rod, and a piston member secured to the lower end of the control tube, said cylinder having ports to form a two-way acting cylinder, one port opening into the cylinder above the piston member, and a second port opening into the cylinder below the piston plate, said piston plate being movable in a direction independent of the piston ring when said piston plate and piston member are positioned in the upper end of the tube.

43. In a shirt buck assembly having a vertical axis, a buck frame that is generally elongated rectangular shaped in vertical elevation, a frame mounting member connected to the lower end of said frame, a pair of wings mounted on said frame for movement in an opposite direction between an extended position and a retracted position relative to said vertical axis, control means on the frame connected to said wings to alternately expand and retract said wings, said frame mounting member including a cylinder and piston, said control means being connected to said cylinder and piston to be operated thereby and including an upright control rod having a lower end, and a control tube having a lower end, said control tube mounted on said control rod for limited slidable movement relative thereto, said piston including a piston plate secured to the lower end of the control rod, and a piston member secured to the lower end of the control tube, a pair of sleeve supports on the buck frame, one sleeve support mounted to be extended and retracted relative to the side of said frame, and means connecting the sleeve supports to the control rod for moving said support as the control rod is moved, said control means including linkage means for connecting the wings to the control tube to move said wings as the control tube is moved.

44. A machine having a loading station and a pressing station for pressing shirts and similar garments comprising an elongated frame, a buck assembly shaped to have a shirt dressed thereon, and means mounted on the frame and having the buck assembly mounted thereon for transferring the buck assembly between the loading station and the pressing station, said means including an upright shaft mounted on said frame, an elongated subframe pivotally mounted on said shaft, a support arm, means movably mounting said support arm on said subframe, said buck assembly being mounted on said support arm and means connected to the subframe for simultaneously pivoting the subframe and moving the support arm to alternately position the buck assembly at the loading station and at the pressing station.

45. A machine having a loading station and a pressing station for pressing shirts and similar garments comprising an elongated frame having a longitudinal axis, an elongated transfer arm-buck support assembly pivotally mounted on said frame, a first buck assembly pivotally mounted on one end portion of the transfer arm-buck support assembly, a second buck assembly pivotally mounted on the opposite end portion of said transfer arm-buck support assembly, means connected to the transfer arm-buck support assembly for pivoting said transfer arm-buck support assembly to alternately transfer one buck assembly between the loading station and the pressing station and the other buck assembly between the pressing station and loading station, said transfer arm-buck support assembly including means connected to each of the buck assemblies for pivoting the respective buck assembly being transferred to the pressing station through a series of positions to maintain an actute angular relationship with the longitudinal axis as the respective buck assembly is transferred to the pressing station by the transfer arm-buck support assembly.

46. A shirt pressing machine having a loading station and a pressing station, a frame, a first buck assembly, a second buck assembly, means mounted on the frame and mounting the first and second buck assemblies for alternately transferring each buck assembly between the loading station and a pressing position at the pressing station, means on the frame for pressing a shirt dressed on the buck assembly located in the pressing position at the pressing station, means mounted on the frame and connected to the pressing means for alternately moving the pressing means between a neutral non-pressing position and a pressing position to press the shirt dressed on the buck located at the pressing station, a yoke press assembly located at the loading station, said yoke press assembly having a yoke presser head and means mounting said yoke presser head for moving said yoke presser head for movement between a pressing position to press the yoke portion of a shirt dressed on the buck assembly located at the loading station and a neutral position clear of the buck assembly at the loading station, means for actuating the transfer means, the pressing means and yoke presser head moving means, said actuating means including a manual operated control for actuating the yoke presser head to a pressing position, means alternately operated by the pressing means moving to a pressing position for preventing actuation of the transfer means to transfer said buck assemblies and by the pressing means returning to the neutral position for permitting actuation of the transfer means, means alternately operated by the yoke presser head moving means moving to a yoke press position for preventing actuation of the transfer means and by the yoke presser head moving means returning to a neutral position to actuate the transfer means to transfer the buck assemblies after the pressing means has moved to a neutral position.

47. A machine having a loading station and a pressing station for pressing shirts and similar garments comprising a frame, a buck assembly having a vertical axis, transfer means mounted on the frame for alternately moving said buck assembly between the loading and the pressing station, said buck assembly being mounted on the transfer means, said buck assembly including a buck frame that is generally rectangular in a vertical plane, wings movably mounted on said buck frame, a tail clamp movably mounted on said buck frame to clamp the tail portion of a shirt to the buck frame, means connected to the wings for alternately moving the wings toward and away from said vertical axis to move said wings between a retracted and an extended position and to said tail clamp to move said tail clamp between a clamping position and an unclamped position, and means connected to the buck frame for operating the means connected to the tail clamp and wings, said last mentioned means including a cylinder-shaft for pivotally mounting the buck frame on a transfer means for rotation about a vertical axis.

48. In a shirt buck assembly having a vertical axis, a buck frame that is of a generally elongated rectangular shape in vertical elevation, a frame mounting member connected to the lower end of said buck frame, a pair of wings mounted on the frame for movement in an opposite direction between an extended and a retracted position relative to said vertical axis, control means on the buck frame connected to said wings to alternately extend and retract said wings, and tail clamp means mounted on the buck frame for movement between a tail clamping position and an unclamped position, and means connected to said control means for operating said control means, said control means including means connected to the control means for moving said tail clamp means between a tail clamping position and an unclamped position, said tail clamp moving means including resilient means constantly urging said tail clamp means to the clamping position and stop means connected to the control means to abuttingly engage the tail clamp means to move the tail clamp means to a non-clamp position.

49. In a shirt buck assembly having a vertical axis, a buck frame that is generally elongated and rectangularly shaped in vertical elevation, a frame mounting member connected to the lower end of said frame, a pair of wings mounted on said frame for movement in an opposite direction between an extended position and a retracted position relative to said vertical axis, a pair of sleeve support members mounted on the frame to be extended and retracted in a horizontal direction, and control means for extending and retracting said sleeve support members and said wings, said control means including for each sleeve support member a sleeve extender lever having one end pivotally secured to the frame and an opposite end pivotally secured to the sleeve support member, a control member, linkage means for connecting the midportions of each of the sleeve extender levers to the control member and means connected to the control member for selectively moving said control member.

50. A machine having a loading station and a pressing station for pressing shirts and similar garments comprising an elongated frame having a longitudinal axis, an elongated transfer arm-buck support assembly pivotally mounted on said frame, a first buck assembly pivotally mounted on one end portion of the transfer arm-buck support assembly, a second buck assembly pivotally mounted on the opposite end of said transfer arm-buck support assembly, means connected to the transfer arm-buck support assembly for pivoting said transfer arm-buck support assembly to alternately transfer one buck assembly between the loading station and the pressing station and the other buck assembly between the pressing station and the loading station, a yoke press assembly mounted at the loading station, said yoke press assembly having a neutral non-pressing position and a press position, a pair of presser means mounted on the frame at the pressing station for pressing a shirt on the buck assembly located at the pressing station and control means connected to the presser means and the yoke press assembly for maintaining each of the buck assemblies at the respective loading station and the pressing station while the yoke press assembly is in a pressing position.

51. A machine having a loading station and a pressing station for pressing shirts and similar garments comprising an elongated frame having a longitudinal axis, an elongated transfer arm-buck support assembly pivotally mounted on said frame, a first buck assembly pivotally mounted on one end portion of the transfer arm-buck support assembly, a second buck assembly pivotally mounted on the opposite end of said transfer arm-buck support assembly, means connected to the transfer arm-buck support assembly to alternately transfer one buck assembly between the loading station and the pressing station and the other buck assembly between the pressing station and loading station, a yoke press assembly located at the loading station for movement between a yoke press position and a neutral position, body press means mounted on the frame at the pressing station for movement between a body press position and a neutral position, said yoke press assembly and body press assembly each including power-operated means for moving said yoke press assembly to a yoke press position and body press means to a body press position, and control means connected to the means for moving said transfer arm-buck support assembly for moving the buck assembly most closely adjacent to the yoke press assembly directly to an end-most position at the loading station as power is applied for normal operation of the machine prior to actuation of the yoke press assembly and body press means to a yoke press position and a body press position respectively.

52. A machine having a loading station and a pressing station for pressing shirts and similar garments comprising an elongated frame, a buck assembly shaped to have a shirt dressed thereon, and means mounted on the frame and having the buck assembly mounted thereon for transferring the buck assembly between the loading station and the pressing station, said buck assembly mounting means including an upright shaft mounted on the frame, an elongated sub-frame pivotally mounted on said shaft, a support arm, and means pivotally mounting said support arm on the sub-frame, said buck assembly being mounted on said support arm, means connected to the sub-frame for alternately pivoting the sub-frame and the support arm to position the buck at the loading station and at the pressing station, and means connected to the support arm for pivoting said support arm in a direction opposite the direction of pivotal movement of the sub-frame as said sub-frame is pivoted.

53. A machine having a loading station and a pressing station for pressing shirts and similar garments comprising an elongated frame, a buck assembly shaped to have a shirt dressed thereon, means mounted on the frame and having the buck assembly mounted thereon for transferring the buck assembly between the loading station and the pressing station, said means including an upright shaft mounted on said frame, an elongated sub-frame pivotally mounted on said shaft, a support arm, and means mounting said support arm on said sub-frame, said buck assembly being mounted on said support arm, means connected to the sub-frame for alternately pivoting the sub-frame and the support arm to position the buck assembly at the loading station and the pressing station, body press means mounted at the pressing station for pressing the body portion of a shirt, said body press means mounted to have a press position and a neutral position, a yoke press assembly having a neutral position and a pressing position for pressing the yoke of a shirt on said buck assembly, means for mounting said yoke press assembly adjacent the path of travel of the buck assembly, said yoke press assembly and body press assembly each including means for operating said yoke press assembly and said body press means between a pressing position and a neutral position, and control means for actuating the operation of the various operating means to retain the buck assembly in a position for the yoke press assembly to press the yoke portion of a shirt dressed on said buck assembly, thence to actuate the transfer means to move said buck assembly to a body press position and next to operate the body press operating means to move said body press means to a body press position.

54. A machine having a loading station and a pressing station for pressing shirts and similar garments comprising an elongated frame having a longitudinal axis, an elongated transfer arm-buck support assembly pivotally mounted on said frame, a first buck assembly, means mounting said first buck assembly for pivotal movement about a vertical pivot axis on one end portion of the transfer arm-buck support assembly, a second buck assembly, means mounting said second buck assembly for pivotal movement about a vertical pivot axis on the opposite end portion of said transfer arm-buck support assembly, means connected to the transfer arm-buck support assembly for pivoting said transfer assembly to alternately transfer one buck assembly between the loading station and the pressing station and the other buck assembly between the pressing station and the loading station, and means coacting with the transfer arm-buck support assembly pivoting means and connected to the buck assemblies for pivoting said buck assemblies relative to the transfer arm-buck support assembly to properly position said buck assemblies at the respective stations.

55. A machine having a loading station and a pressing station for pressing shirts and similar garments comprising an elongated frame, an elongated transfer arm-buck support assembly pivotally mounted on said frame, a buck assembly pivotally mounted on one end portion of the transfer arm-buck support assembly, means connected to the transfer arm-buck support assembly for pivoting said transfer arm-buck support assembly to alternately transfer the buck assembly between the loading station and the pressing station, said transfer arm-buck support assembly including means connected to the buck assembly for pivoting the buck assembly about a vertical axis in a direction opposite the direction of pivotal motion of the transfer arm assembly to properly position the buck assembly at the respective stations to facilitate dressing a shirt on the buck assembly and pressing a shirt dressed on the buck assembly.

56. A machine having a loading station and a pressing station for pressing shirts and similar garments comprising a frame, a buck assembly having a vertical axis, transfer means mounted on the frame for alternately moving said buck assembly between the loading station and the pressing station, said buck assembly being mounted on the transfer means, said buck assembly including a buck frame that is generally rectangular in a vertical plane, wings movably mounted on the buck frame, a tail clamp movably mounted on said frame to clamp the tail portion of a shirt to the buck frame, means connected to the wings for alternately moving the wings toward and away from said vertical axis to move said wings between a retracted position and an extended position, means connected to the tail clamp for moving the tail clamp between a clamping position and an unclamped position, and means for operating the means connected to the tail clamp and wings, said operating means being connected to the buck frame and mounted on the transfer means for movement therewith and including one piston cylinder combination and means operated by said one piston cylinder combination for actuating said tail clamp moving means and wing moving means respectively to move the tail clamp to a clamping position and the wings to an extended position.

57. In a first buck assembly having a vertical axis, a buck frame that is generally elongated and rectangular shaped in vertical elevation, a frame mounting member connected to the lower end of said frame, a pair of wings mounted on said buck frame for movement in opposite directions between an extended position and a retracted position relative to said vertical axis, control means on the frame connected to said wings to alternately extend and retract said wings, said frame mounting member including a piston and a cylinder, said control means being connected to said piston to be operated thereby and including an elongated upright control member connected to said piston to be moved thereby, a pair of support arms, each of said support arms being pivotally connected at one end to the buck frame and at the other end to one of the respective wings, and a pair of linkage arms, each of said linkage arms being pivotally connected at one end to the control member to be moved thereby and being pivotally connected at the opposite end to the respective support arm for moving the support arm, said support arms and linkage members being of a length and said pivotal connections of said support arms and linkage arms to the control member, frame and wings being positioned for the control arm to exert a greater force on the wings the further said wings are extended.

References Cited in the file of this patent

UNITED STATES PATENTS

| | | |
|---|---|---|
| 2,126,577 | Rawlinson | Aug. 9, 1935 |
| 2,241,373 | Rawlinson et al. | May 6, 1941 |
| 2,355,699 | Bicknell | Aug. 15, 1944 |
| 2,395,466 | Couch | Feb. 26, 1946 |
| 2,627,128 | Jones | Feb. 3, 1953 |
| 2,698,705 | Hitz | Jan. 4, 1955 |
| 2,757,832 | Johnson et al. | Aug. 7, 1956 |
| 2,757,833 | Petre | Aug. 7, 1956 |
| 2,807,396 | Davis | Sept. 24, 1957 |
| 2,834,523 | Maxwell et al. | May 13, 1958 |
| 2,875,929 | Langen et al. | Mar. 3, 1959 |

UNITED STATES PATENT OFFICE
CERTIFICATE OF CORRECTION

Patent No. 3,070,268                 December 25, 1962

Virgil R. Carpenter

It is hereby certified that error appears in the above numbered patent requiring correction and that the said Letters Patent should read as corrected below.

Column 2, line 42, for "ina" read -- in a --; column 5, line 49, for "shot" read -- short --; column 10, line 56, for "portion" read -- position --.

Signed and sealed this 2nd day of July 1963.

(SEAL)
Attest:

ERNEST W. SWIDER
Attesting Officer

DAVID L. LADD
Commissioner of Patents